United States Patent [19]

Giles et al.

[11] 4,371,328

[45] Feb. 1, 1983

[54] APPARATUS FOR MAKING COMPOSITION LOGS BY COMPRESSING PARTICLES

[76] Inventors: Duane D. Giles, 3605 N. Paradise Rd., Flagstaff, Ariz. 86001; Richard W. Osborn, 4667 Ridgeway, Los Alamos, N. Mex. 87544

[21] Appl. No.: 254,063

[22] Filed: Apr. 14, 1981

Related U.S. Application Data

[63] Continuation-in-part of Ser. No. 137,790, Apr. 7, 1980, abandoned.

[51] Int. Cl.³ .......... A01J 25/12

[52] U.S. Cl. .......... 425/344; 425/345

[58] Field of Search .......... 425/344, 345

[56] References Cited

U.S. PATENT DOCUMENTS

| | | | |
|---|---|---|---|
| 2,833,633 | 5/1958 | Hecht | 44/13 |
| 3,232,722 | 2/1966 | Sanders | 44/13 |
| 3,240,573 | 3/1966 | Eyre, Jr. | 44/13 |
| 3,427,960 | 2/1969 | Napolitano | 100/218 |
| 3,506,415 | 4/1970 | Paladino | 44/13 |
| 3,706,540 | 12/1972 | Stanton | 44/12 |

*Primary Examiner*—James R. Hall

*Attorney, Agent, or Firm*—H. Gordon Shields

[57] ABSTRACT

Compacting apparatus for making composition logs from particulate matter includes a compression chamber having a precompression chamber axially aligned on one end of the compression chamber and a feed mechanism for feeding particulate matter for loading into the precompression chamber for compression ultimately in the compression chamber.

34 Claims, 25 Drawing Figures

APPARATUS FOR MAKING COMPOSITION LOGS BY COMPRESSING PARTICLES

CROSS-REFERENCE TO A RELATED APPLICATION

This application is a continuation-in-part of copending application Ser. No. 137,790, filed Apr. 7, 1980, and now abandoned.

BACKGROUND OF THE INVENTION

1. Field of the Invention

This invention relates to apparatus for compressing particulate matter and, more particularly, to apparatus for compressing particulate matter with heat and compressive force.

2. Description of the Prior Art

Prior art compacting machines generally embody either an extrusion screw apparatus or a ram compression apparatus for compressing or compacting particulate matter. In the extrusion screw apparatus, particulate matter is forced by a screw auger through a forming die and into a tube. Because of the friction in the tube, considerable back pressure is developed at the end of the screw, causing bonding of the particulate matter. Such machines have the advantage that air and excess moisture have a channel for escaping along the screw, and they have a further advantage in that the particulate material is well mixed and evenly distributed throughout the length of the product being formed.

Machines using the extrusion screw concept also have disadvantages in that the tube is susceptible of plugging, which generally results in substantial down time for the machine. Moreover, the center of the product formed is often hollow or is less dense than the exterior of the product, since the particulate matter under pressure at the end of the screw flows radially to fill the space left by the core of the screw, after, or as, the screw is retracted.

Another disadvantage of the extrusion screw concept is the susceptibility of severe wear of the extrusion tube and screw if abrasive material, such as coal, bark, or other residue containing dirt, and the like, is introduced into the machine.

In the ram compression apparatus, a charge of particulate material is placed in a compression chamber, and a ram presses the material into a cylindrical product, such as a log. Such apparatus is advantageous in that it provides a very high compacting force, and it is not easily plugged. However, it also has a disadvantage in that air and excess moisture can be trapped in the compression chamber as the product is being formed. Moreover, in order to achieve the necessary production scheduling to make the process cost efficient, the product cannot be maintained at a relatively high compacting pressure for more than a relatively short period of time.

U.S. Pat. No. 2,833,633 discloses apparatus for forming particulate matter, such as saw dust, into logs. Particulate matter is fed into a relatively long tube and is compressed as it flows through the tube. Within the tube, the compressed material forms a continuous log which is broken off in predetermined lengths, if desired, at the discharge end of the tube. The tube is fed from a hopper, and a piston or ram is used to compress the material in the tube.

U.S. Pat. No. 3,232,722 discloses apparatus for producing logs from particulate matter, such as saw dust, wood chips, and the like. A screw auger is used to feed the particulate matter into a cylindrical sleeve. This first sleeve includes a plurality of axially extending keys to prevent the particulate matter from rotating with the screw and to keep the particulate matter from moving longitudinally in the sleeve. From the sleeve, the particulate material flows through a second sleeve and into an extrusion die where compaction takes place. The diameter of the second sleeve tapers from that of the first sleeve about the screw auger to the minimum diameter of the extrusion die.

U.S. Pat. No. 3,240,573 discloses apparatus for manufacturing a log from sawdust mixed with a filler or extender, wax, and a binder. A screw auger is used to convey the sawdust, with its ingredients mixed together, directly to a bag in which the mixture will be packaged. Compaction occurs within the bag.

U.S. Pat. No. 3,427,960 discloses apparatus for compacting material, such as sawdust and binder, into cylindrical blocks. A rotating drum having at least three compression chambers, open at both ends, is used for forming the cylindrical blocks. The chambers in the rotating drum are successively aligned with a feeding position, a compression position, and a discharge position. Material is first fed into a chamber, and is then compressed within the chamber, and eventually the material is discharged from the chamber.

U.S. Pat. No. 3,506,415 discloses apparatus for producing cylindrical logs by compressing particulate material and a binder. An auger screw is used to advance the material through a cylinder or barrel where the material is compacted and formed.

SUMMARY OF THE INVENTION

The invention described and claimed herein comprises apparatus for compressing particulate matter by feeding particulate matter into a precompression chamber and a compression chamber, compressing the material in the precompression chamber and into the compression chamber, and then removing the compressed material from the compression chamber after heating the material to cure it. The compression chamber is tapered to prevent the material from binding or blocking the compression chamber and to insure uniform compaction.

Among the objects of the present invention are the following:

To provide new and useful apparatus for forming particulate matter into a solid product;

To provide new and useful apparatus for compressing particulate matter;

To provide new and useful apparatus for forming particulate matter of various sizes and densities into a solid product;

To provide new and useful apparatus for compressing particulate matter using a precompression chamber and a compression chamber; and To provide new and useful apparatus for forming a high density block from particulate matter.

DESCRIPTION OF THE PREFERRED EMBODIMENT

Figure 1:
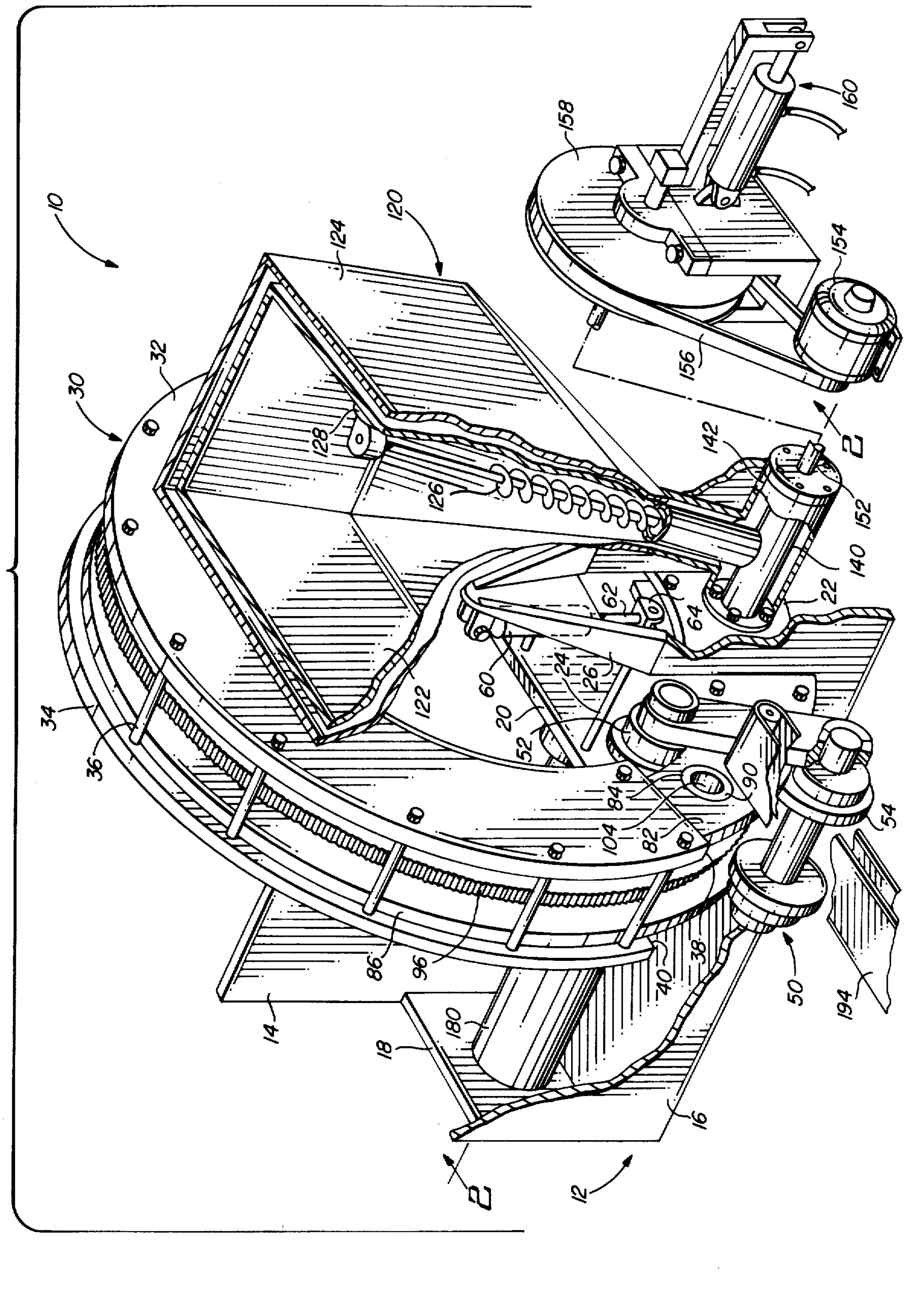
FIG. 1 is a perspective view, with a portion broken away, of the apparatus of the present invention.
Figures 2, 10:
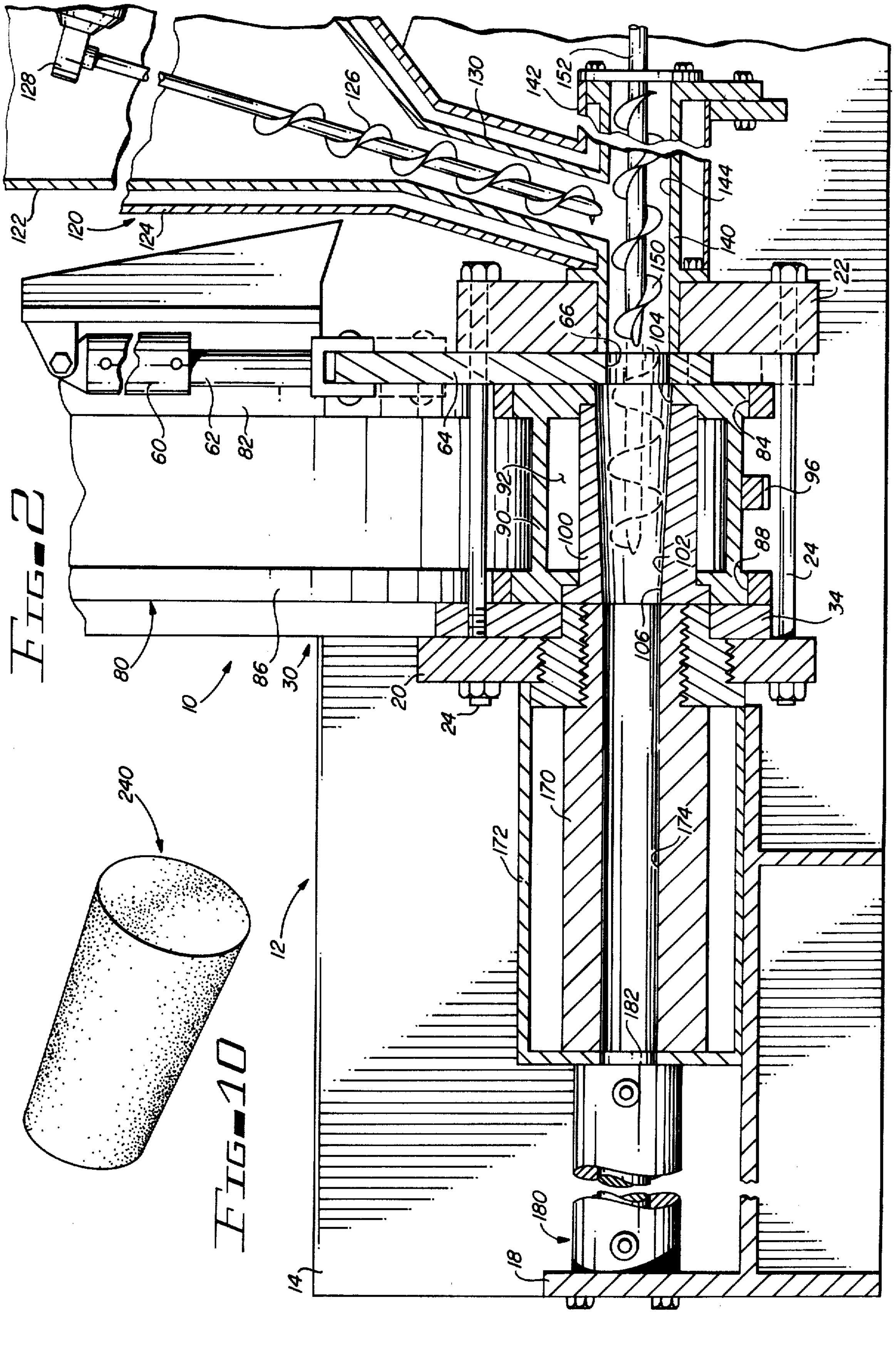
FIG. 2 is a view in partial section of a portion of the apparatus of FIG. 1, taken generally along line 2—2 of FIG. 1.
FIG. 10 is a perspective view of a completed particulate block formed by the apparatus of the present invention.

FIG. 1 is a perspective view of particulate compacting apparatus 10 embodying the present invention. A portion of the apparatus 10 is shown partially broken away in FIG. 1 to illustrate details of the apparatus. FIG. 2 is a view in partial section of a portion of the compacting apparatus 10 of FIG. 1, taken generally along line 2—2 of FIG. 1. For the following descriptive material, reference will be made primarily to FIGS. 1 and 2.

The particulate compacting apparatus 10 includes a base 12 to which a number of subassemblies are secured. The base 1 includes a pair of fixed side plates, including a primary side plate 14 and a primary side plate 16. The side plates 14 and 16 are disposed substantially parallel to each other and spaced apart. Extending between the side plates 14 and 16 at one end of the apparatus 10 is a support plate 18, which may be referred to as a hydraulic unit support plate. The purpose of the plate 18 is to support a hydraulic unit which will be discussed in detail below.

A housing 30 is secured to the base 12. The housing 30 includes a pair of fixed outer plates 32 and 34 which are spaced apart from each other and are appropriately secured together by a plurality of bolts or tie rods 36. The plates 32 and 34 are generally circular, ring configurations, with a pair of gaps or openings in the plates which are generally parallel to, or aligned with, each other. Viewing the compacting apparatus 10 in FIG. 1, and taking the top or upper portion of the apparatus to be the twelve o'clock position, the gaps in the outer plates 32 and 34 would be between about the seven o'clock and the eight o'clock positions. The plate 32 includes a "bottom" edge 38, and the plate 34 includes a "bottom" edge 40, with the edges 38 and 40 defining the beginnings of the gaps or openings in the outer plates 32 and 34 of the housing 30. The "top" edges of the rings or plates 32 and 34 are not shown in FIG. 1, due to the illustration of other elements. However, it will be noted that the "top" edges define, with the "bottom" edges, the spaces or gaps in the rings or plates. The "bottom" edges 38 and 40 actually comprise the top or upper portions of the spaces or gaps in the plates 32 and 40. The spaces or gaps are used for loading and unloading purposes, as will be discussed in detail, below.

As best shown in FIG. 2, but also shown in FIG. 1, are a pair of spaced apart reinforcing plates 20 and 22 which are appropriately secured to the base 12 through the housing 30. The plates 20 and 22 are best shown in FIG. 2, but they are also shown in FIG. 1. The plate 20 may be referred to as a back plate or back block, and the plate 22 may be referred to as a head plate or head block. They provide reinforcing strength for the compression of the particulate matter, as will be discussed below.

Within the housing 30 is a rotating frame 80. The frame 80 includes a pair of end plates 82 and 86 which are appropriately spaced apart. They support a plurality of cylinders 90. The plates 82 and 86 are spaced apart a distance which coincides with the axial length of the cylinders 90. The plates 82 and 86 are, of course, substantially parallel to each other, and substantially parallel to the plates 32 and 34 of the housing 30.

The cylinders 90 extend between the plates 82 and 86 and are disposed within aligned apertures 84 and 88 in the rotating end plates 82 and 86, respectively. The cylinders 90 are spaced apart from each other a fixed, predetermined distance.

Within each cylinder 90 is a compression die 100. Each cylinder 90 and its compression die 100 are, of course, substantially coaxially disposed. The cylinders 90 are appropriately secured to the end plates, and the compression dies 100 are in turn appropriately secured within the cylinders 90.

A cavity 92 is defined between the exterior of the compression die and the interior of the cylinder 90. The cavity 92 may be filled with a coolant fluid, or the like, as will be discussed below. As may be understood, a heating medium may also be disposed in the cavity 92, if desired.

As best shown in FIG. 2, the compression die 100 includes a linearly tapered bore 102. The taper of the bore 102 is outwardly extending from a minimum diameter mouth 106 at the outer plate 34 and the back plate or back block 20 towards a maximum diameter mouth 102 at the end plate 82 and the head plate or head block 22. The purpose of the taper of the bore 102 will be discussed in detail below.

The frame 80 rotates within the housing 30 on a pair of roller assemblies, of which a roller assembly 50 is shown in FIG. 1. The roller assembly 50 includes an inner roller 52 and an outer roller 54, appropriately secured together, and appropriately secured to the housing 30. The inner periphery of the end plates 82 and 86 are in contact with the roller assembly 52, and the outer periphery of the end plates 82 and 86 are in contact with the outer roller 54. The roller assembly 50, with its mate, not shown, allows the frame 80 to rotate within the housing 30. The roller assembly 50, with its mate, also substantially supports the frame 80 within the housing 30.

For moving the frame 80 within the housing 30, an appropriate drive mechanism, not shown, is utilized. The drive mechanism includes a toothed rack 96 which is secured to the cylinders 90 between the plates 82 and 86. The rack 96 includes a plurality of spaced apart gear teeth adapted to be engaged by a ratchet-type lever or pawl which moves appropriately to index itself on the rack 96 and, under hydraulic pressure, moves the frame 80 a fixed, predetermined distance with periodic, timed movements in accordance with the capacity of the apparatus of the present invention. This will be discussed in detail below.

Secured to the base 12 is a support structure 26 which comprises a frame to which is secured a hydraulic cylinder 60. The hydraulic cylinder 60 is in turn secured through a rod 62 to a plate 64. The plate 64 comprises a gate disposed between the head plate or block 22 and the end plate 82 of the frame 80. The gate 64 includes an aperture 66 which is aligned with a wide mouth 104 of the tapered bore 102 of the compression die 100 for purposes of loading or filling the compression die 100 with particulate matter. As shown in FIG. 2, during the loading sequence the aperture 66 in the gate 64 is aligned with the bore 102 of the compression die 100 at the wide mouth 104. After the loading process is completed, the gate 64 is moved downwardly, to the position shown in phantom in FIG. 2, where the aperture 66 is removed from alignment with the bore 102, and the solid portion or flat side of the gate 64 then covers the bore 102. The gate 64 then defines, with the block 22, a relatively solid head for the compression die 100 and for its bore 102, which becomes a compression cylinder for the particulate matter, which will be explained below.

Appropriately secured to the base 12, and disposed adjacent to the head plate or head block 22, and appropriately secured thereto, is a particulate feed assembly 120. The particulate feed assembly 120 includes a hopper 122, about which is disposed a heating jacket 124. Within the hopper 122 is a generally vertically extending feed auger 126. The auger 126 includes its own motor and gear system 128. The auger 126 is fixed in position, and extends downwardly through the hopper 122 and terminates within a feed tube 130. The feed tube 130 comprises a lower portion of the hopper 122.

The feed tube 130 communicates directly with a loading cylinder 140. The loading cylinder 140 is generally cylindrical in configuration and extends horizontally. About the loading cylinder 103 is a jacket 142, which comprises a continuation of the heat jacket 144 for the feed assembly 120. The load cylinder 140 and its jacket 142 are both appropriately secured to the head plate or block 22. The load cylinder 140 includes an interior bore 144 which communicates directly with the tapered bore 102 of the compression die or cylinder 100. The diameter of the bore 144 is preferably cylindrical. The bore 144 has a diameter which is substantially the same as the diameter of the narrow end, or rear mouth or opening, 106 of the bore 102 of the compression die 100.

Disposed substantially coaxially with the bore 144 of the loading tube 140 is an auger 150. The auger 150 includes a movable rod 152 which is disposed on the cylindrical axis of the tube 140. The auger 150 receives a supply of particulate material from the loading hopper 122 via the auger 126. During the loading of the compression die 100, the auger 150 receives the particulate matter and conveys it directly into the tapered bore 102 of the compression die 100. The auger 150 rotates, as is well known and understood, and it also moves generally horizontally, as shown in FIG. 2 in phantom, and is also shown in the schematic illustration in FIG. 5, which will be discussed below.

Movement of the rod 152 is accomplished by two different systems. Rotary movement of the rod 152, and of the auger 150 secured thereto, is accomplished by a motor 154 acting through a belt 156 on a wheel 158 secured to the rod 152. The horizontal movement, or in and out travel, of the auger 150 and the rod 152 is accomplished by hydraulic motor 160 which is appropriately secured to the rod 152.

Aligned with the tapered bore 102 of the compression die or cylinder 100, and also with the loading tube 140, is a precompression cylinder 170. The precompression cylinder 170 includes a jacket 172 disposed about it for heating or cooling purposes, as desired, similar to the jackets 124 and 142 disposed about the hopper 122 and the loading cylinder 140, respectively. The jackets 172, 142, and 124, are spaced apart from their respective elements, and the space between the jackets and their elements may be used for appropriate heating or cooling media, as desired.

The precompression cylinder 170 is appropriately secured to the back plate or block 20. The block 20 is in turn secured to the outer plate 34 of the housing 30 and, by a plurality of bolts or tie rods 24, to the head plate or head block 22, and accordingly to the outer plate 32.

Within the precompression cylinder 170 is a bore 174, the diameter of which is substantially the same as that of the mouth or opening 106 of the bore 102, which is also substantially the same as the aperture 66 in the gate 64 and the bore 144 of the loading tube 140. The bores 102, 144, and 164 are coaxially aligned, as best shown in FIG. 2. The length of the bore 174 of the precompression cylinder 170 is about twice the length of the bore 102 of the compression die 100. The bore 174 defines a precompression chamber for the particulate matter fed through the hopper 122. The bore 102 comprises a compression chamber into which the particulate matter is ultimately compressed.

Figure 7:
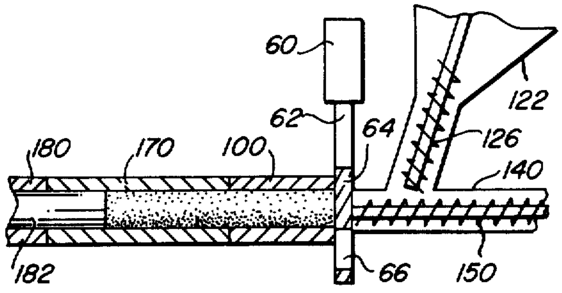

A hydraulic cylinder 180 is secured to the hydraulic support plate 18 of the base 12 and to the precompression cylinder 170. Under appropriate control, a compression ram or piston 182, within the cylinder 180, is hydraulically moved from its retracted position, as shown in FIG. 2, to its full extended or compression position adjacent to the mouth 106 of the bore 102. This is schematically shown in FIG. 7.

Figure 3:
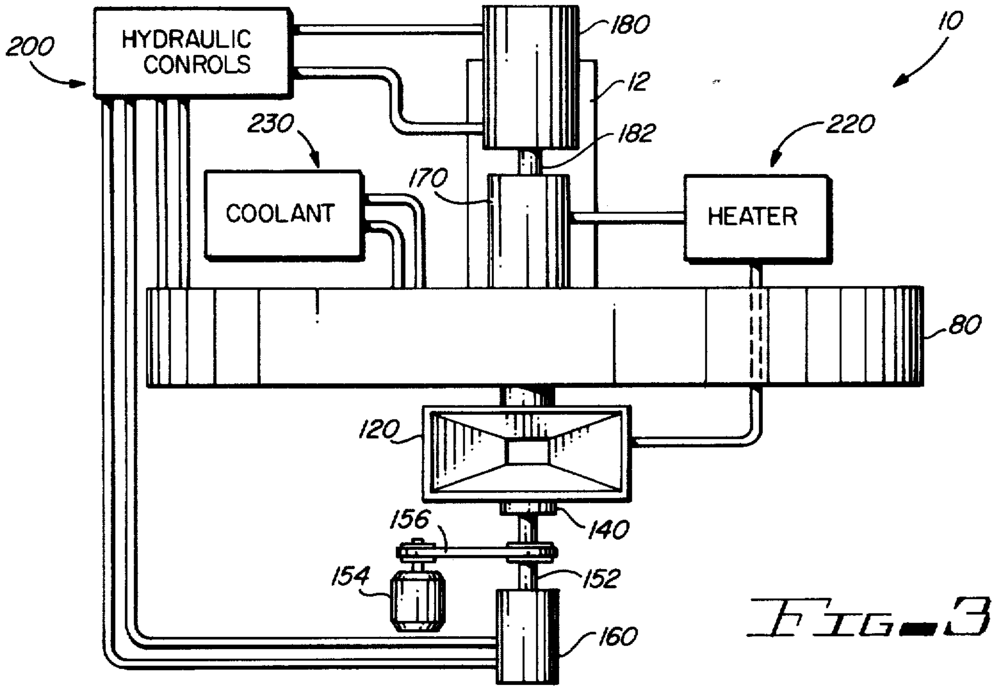
FIG. 3 is a top schematic representation of the apparatus of FIGS. 1 and 2.

FIG. 3 is a schematic diagram of the particulate compacting apparatus 10 discussed above. The primary elements concerned with the compacting of particulate material are illustrated in conjunction with three subsystems which have been mentioned, but which have not been discussed in detail. The base 12 is shown in FIG. 3, with the rotating frame 80 disposed adjacent to the base 12. The feeding assembly 120 is shown disposed above the feed tube 140, with the auger rod 152 extending from the hydraulic cylinder 160 beneath the hopper 120 to the frame 80 (see FIGS. 1 and 2). The motor 154 is shown connected to the rod 152 by means of the belt 156.

On the opposite side of the frame 80 from the feeding assembly 120, the feed tube 140, and its associated auger rod and hydraulic cylinder, is the precompression cylinder 170 and the hydraulic cylinder 180 which actuates the ram or piston 182. The compression cylinder 100, itself, as shown best in FIG. 2, is disposed within the frame 80. Actually, there are a plurality of compression dies or cylinders 100 disposed within the frame 80 and which are selectively indexed with the feeding or loading cylinder 140 and with the precompression cylinder 170 for loading with particulate matter to be compressed by the apparatus. As the frame 80 rotates within the housing 30 (see FIG. 1), the compression cylinders are sequentially indexed or aligned for loading and for compression purposes.

The three subsystems mentioned above, and shown in FIG. 3, include a hydraulic control system 200, a heater system 220, and a coolant system 230. The three subsystems 200, 220, and 230 are schematically represented in FIG. 3. The three subsystems are connected to the various elements of the particulate compacting apparatus 10 so as to provide the desired effect on the particulate matter.

The hydraulic control system 200 is shown with lines extending to the hydraulic cylinder 180, which actuates the ram or piston 182 for the precompression cylinder 170, and to the hydraulic motor or cylinder 160 which actuates the auger 150 through its rod 152. The hydraulic cylinder 160 causes the rod 152 to reciprocate, while the motor 154 causes the rod 152 to rotate. As discussed above, the auger rod 152 rotates and reciprocates for loading purposes. The reciprocation of the auger 150, and its rod 152, is illustrated best in the schematic representations of FIGS. 4–8, and will be discussed in detail below.

A pair of hydraulic lines are also shown extending from the hydraulic control system 200 to the frame 80. The hydraulic control lines for the frame 80 may be used to cause the frame 80 to rotate. In the alternative, rather than using a hydraulic control system, including a hydraulic motor or actuator, for the rotation of the frame 80, an electric motor may be used. However, for illustrative purposes, hydraulic lines are shown in FIG. 3.

As is well known and understood, hydraulic systems may be used to exert a substantial amount of pressure, as desired. For the compression purposes, and for other purposes, it is deemed advantageous to use a hydraulic control system with the apparatus of the present invention. While each hydraulic cylinder may include its own hydraulic motor, the automating of the process embodied in the apparatus of the present invention requires a control system of some type. Thus, a single hydraulic control system 200 is shown in FIG. 3 as connected to the various elements requiring control.

A heating jacket is shown in FIGS. 1 and 2 as being disposed about both the precompression cylinder 170 and the loading cylinder 140. The heating jackets require a source of heat, and thus a heater 220 is schematically represented in FIG. 3. In the basic process employed by the particulate compression apparatus 10, it is desired that the particulate matter be heated prior to compression. Accordingly, heat jackets 124 and 142 are disposed about the heat assembly 120 and the load cylinder 140, respectively, and a heating jacket 172 is shown disposed about the precompression cylinder 170.

The heat involved in the loading of the compression cylinder or die 100 must be dissipated during the curing cycle. The curing of the particulate, whether it be a log made of sawdust, wood chips, coal dust, or the like, is accomplished while the frame 80 rotates. The cooling is accomplished within the cavities 42 in the cylinders 90 disposed about the compression dies or cylinders 100. To provide a source of a cooling fluid, or coolant, a coolant system 230 is required. To coolant system 230 is shown connected to the frame 80.

Pressure applied to the particulate material compacts the material into the desired size, within the die 100, and the heat causes the particulate material to "relax" and thus to overcome its inherent spring-back tendency after compression.

Referring again to FIG. 1, as the frame rotates in a counterclockwise direction, as viewed in FIG. 1, each compression cylinder or die rotates with the frame 80 and is subject to the cooling of the coolant jacket 90 disposed about the compression die. At such time as a particular compression die or cylinder 90 rotates to the position of the cylinder 90 shown in FIG. 1, the completed particulate log is cured sufficiently to be ejected from the tapered bore 102 of the compression die 90 through the inlet mouth 104.

As shown in FIG. 1, a cylinder 90 is positioned adjacent to a conveyor belt 194 and the cylinder 90 is shown positioned beneath the bottom or openings 38 and 40, respectively, of the outer plates 32 and 34 of the housing 30. As discussed above, the outer plates 32 and 34 define end walls for the cylinders 90 during the curing process of the particulate matter, which process begins after the compression die or cylinder is loaded and the gate 64 closes the inlet mouth 104 of the cylinder and the piston or ram 182 (see FIG. 2) compresses the particulate matter within the bore 102 of the cylinder 100. At the conclusion of the compression stroke, the frame 90 is rotated to place the inlet mouth 104 and the rear mouth or opening 106 of the tapered bore 102 within the outer plates 32 and 34 of the housing. While the frame 80 rotates within the housing, the outer plates maintain their function as end plates for each compression cylinder or die during the curing process. At the conclusion of the curing process, which time is defined as the length of time it takes for a revolution of the frame 80 from the end of the compression stroke until the mouth 104 of the bore 102 and the cylinder 90 is disposed adjacent to the conveyor belt 194, as shown in FIG. 1. Since the curing of the particulate matter, which is in the configuration of a tapered cylinder or "log", is substantially complete, the end plate function of the plates 32 and 34 is completed. Another hydraulic cylinder 190 (see FIG. 9) actuates its piston 192 to cause the cured log to be pushed from the compression die and out through the wide mouth 104 onto the conveyor 194. The conveyor 194 then moves the log for appropriate disposition. The hydraulic cylinder 190 is disposed with respect to the housing 30 so that a cylinder 90, with its compression die 100 disposed therein, is indexed for removal of a cured particulate log upon each indexing movement of the frame 80, as discussed above.

Sequentially, the feed assembly 120 feeds material to the feed tube 140, which in turn loads both the precompression cylinder 170 and the compression die 100 with the particulate matter from the hopper 122 of the feed assembly 120. The auger 150 rotates in the same direction in both its inward and outward travel. The term "inward" is used to designate the movement of the auger 150 into the chambers or cylinder bores of the compression die 100 and the precompression cylinder 170, and the term "outward" is used to designate the return movement of the auger 150 as it retracts from the precompression cylinder and the compression die.

The auger 150 includes a well known pressure responsive reversing system (not shown) in which the pressure of the particulate matter loaded by the auger 150 into the precompression chamber or cylinder and the compression chamber or die increases to a predetermined amount. When the predetermined back pressure is reached, the auger 150 ceases its inward movement and begins its outward movement to withdraw from the precompression chamber and the compression chamber. Such pressure sensing control systems are well known and understood.

At such time as the auger 150 is withdrawn to its full retracted position, the hydraulic cylinder 60 is actuated, which causes the gate 64 to move downwardly between the head block 22 and the end plate 82 of the frame 80. The downward movement of the gate 64 may cause some particulate matter disposed within the aperture 66 of the gate 64 to be moved downwardly, also. The particulate matter thus trapped within the aperture 66, between the end plate 82 and/or the end of the cylinder 90 disposed in the end plate 82, does no harm. It will be transmitted or conveyed into the next compression die, during the next sequential load cycle of the apparatus 10.

When the gate 64 is in its down position, shown in phantom in FIG. 2, the mouth 104 of the compression bore or chamber 102 is sealed and is ready for the compression of the material. The loading, and initial precompression, by the loading subassembly, which comprises both the feed assembly 120 and the load cylinder 140, and their associated elements, is now completed.

With the gate 64 closed, the hydraulic cylinder 180 is actuated to cause its compression piston or ram 182 to move into the precompression chamber or bore 174 of the precompression cylinder 170, and the compression of the particulate matter disposed therein and in the compression chamber or bore 102 begins.

The precompression step is accomplished during the loading procedure, and, as discussed above, comprises the initial precompression of the particulate matter to a predetermined amount. When the predetermined amount of precompression force is achieved, the loading auger 150 withdraws from the precompression chamber and the compression chamber. The space occupied by the auger 150 and its rod 152 is available for compression purposes, and the length of the precompression chamber 174, which is about twice the length of the compression chamber or bore 102, provides, ultimately, the proper compression for compacting the particulate matter, as desired.

There is a pressure release system associated with the hydraulic cylinder 180 and its ram or piston 182, similar to that of the loading system. Under some circumstances, the proper or desired, predetermined degree or amount of compression on the particulate matter may be reached prior to the full length or stroke of the ram or die 182. Preferably, the full inward stroke of the ram positions it adjacent to the mouth or opening 106 of the bore 102. However, when the desired compression force is achieved, as measured by the back pressure, the piston 182 stops its forward or inward travel toward the compression die 100. The pressure is then maintained until the frame 80 moves the loaded compression die 100 from the alignment with the precompression chamber 170 and the load tube 104. When the frame 80 moves, the piston 182 retracts from the precompression cylinder 170.

The frame 80 moves between the outer plates 32 and 34 of the housing 30. The outer plates 32 and 34 act as end plates for the open compression chamber 102 of the die 100.

Sequentially, the next cylinder 90 and compression die 100 is indexed into position between the aligned bores 144 and 174 of the feed tube 104 and the precompression cylinder 170, respectively, for a repeat of the loading cycle. When the new compression die 100 is in position, the hydraulic cylinder 60 is again actuated to raise the gate 64 and the feed auger 150 commences to load the compression die and the precompression cylinder with a fresh charge of particulate matter.

The piston or ram 182 is withdrawn or retracted into its cylinder 180 after the loaded die 100 moves away from the precompression cylinder. Accordingly, when the auger 150 begins its movement, as shown in phantom in FIG, 2 to load the compression cylinder or die and the precompression cylinder, the full length of the precompression cylinder bore or chamber is available for loading. Any particulate matter disposed within the aperture 66 of the gate 64 is moved by the auger into the compression die and into the precompression chamber, and any particulate matter remaining in the precompression cylinder remains and is compacted with the fresh charge of particulate matter. The loading, precompression, and compression cycles or steps are then repeated with another compression die on the frame 80.

FIGS. 4–8 are schematic representations showing the sequential action of the apparatus of the present invention, as discussed above in conjunction with FIGS. 1–3. For the following discussion, reference will primarily be made to the schematic representations of FIGS. 4–8.

Figure 4:
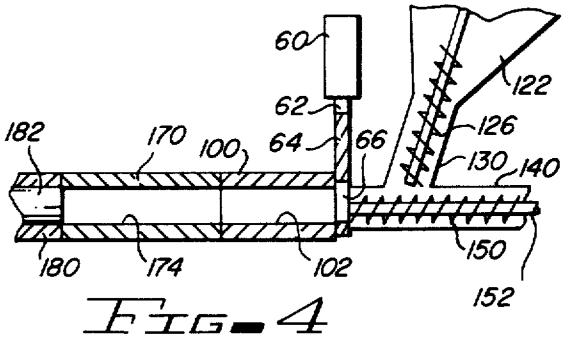
FIGS. 4–8 are schematic representations of the loading and pressurizing sequence in the apparatus of FIGS. 1–3.

In FIG. 4, a compression die 100 is shown disposed adjacent to, and aligned with, the load cylinder 140. The gate 64 is shown in its "up" position, with its aperture 66 aligned with the bore 102 and with the feed tube bore 144. With the die 100 disposed as shown in FIG. 4, indexed appropriately between the precompression cylinder 170 and the load cylinder 140, the bore 102 of the die 100 is ready for loading with particulate matter.

Figure 5:
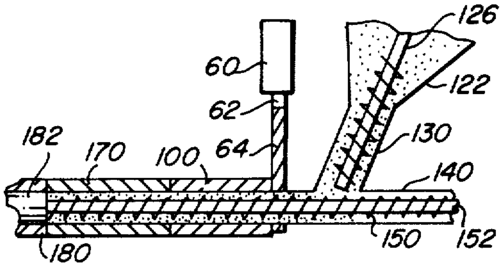

The auger 126 within the hopper 122 of the feed assembly 120 provides a relatively constant supply of particulate matter from the hopper 122, through the feed tube 130, and to the auger 150 within the load cylinder 140. The auger 150 rotates to cause the particulate material to be moved "forwardly" into the die 102. The auger 150 also moves axially within the load tube or cylinder 140 so that particulate matter is transported into and through the bore 102 of the die 100 and into the bore 174 of the precompression cylinder 170. The "forward" or "inward" movement of the auger 150 is illustrated in FIG. 5. The auger 150 is shown extending virtually through the precompression cylinder 170, as well as through the compression die 100, and is disposed adjacent to the ram or piston 182. The ram 182 is fully retracted into the hydraulic cylinder 180.

At such time as the auger 152 reaches its "forward" limit, as shown in FIG. 5, the auger 150 is retracted by the "rearward" reciprocation of its shaft or rod 152. The auger 150 continues to rotate in the same direction, clockwise as viewed in the Figures, and thus it backs out through the same hole or convoluted passageway within the particulate matter disposed within both the compression die 100 and the precompression cylinder 170.

Figure 6:
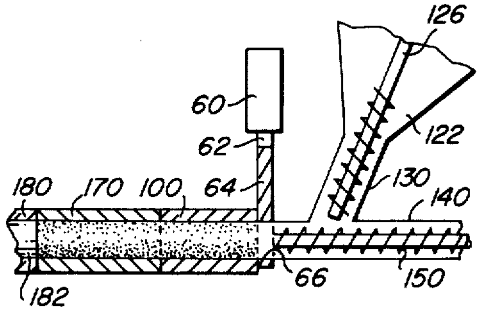

At such time as the auger 150 is retracted from the compression die 100, and from the aperture 66 in the gate 64, as shown in FIG. 6, the hydraulic cylinder 60 is actuated. When the cylinder 60 is actuated, the gate 64, secured to the rod 62, moves downwardly, causing the aperture 66 to move away from the mouth 104 (see FIG. 2) of the compression die 100. The gate 64 then acts as an end plate or cylinder head for the compression die or cylinder 100. This is shown in FIGS. 7 and 8.

With the gate 64 closing the end of the compression die or cylinder 100, the hydraulic cylinder 180 is actuated to cause the ram or piston 182 to begin its inward compression stroke. In FIG. 7, the piston 182 is shown on its compression stroke within the precompression cylinder 170.

Initial precompression of the particulate matter is, of course, accomplished within the precompression cylinder by the auger 150, itself. As discussed above, the auger 150 stos its forward or inward, loading movement, as illustrated in FIG. 5, upon reaching a preset resistance or force (back pressure), or the forward limit of its travel, whichever occurs first. The preset resistance or force indicates that the initial precompression of the particulate matter has been accomplished. The precompression limit, predetermined for the auger 150, is generally accomplished prior to the auger 150 completing the entire possible length of its inlet or inward stroke. The final or high compression of the particulate matter is then accomplished by the piston 182 as it moves through the precompression cylinder 170.

Figure 8:
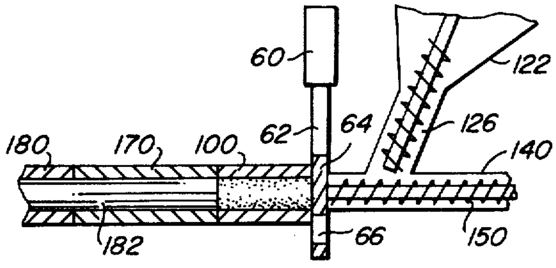

In FIG. 8, the piston 182 is shown at the end of its compression stroke, where it is disposed at the juncture of the precompression cylinder 170 and the compression die or cylinder 100. With the gate 64 defining one end or head for the compression cylinder 100, and the end of the piston 182, adjacent the juncture of the precompression cylinder 170 and the die 100, or within the precompression cylinder 170 if the predetermined back pressure is reached first, defining the opposite end or head of the compression cylinder 100, the particulate matter within the compression cylinder 100 is compressed to its minimum size and maximum density. When the piston 182 reaches the end of its travel, as shown in FIG. 8, the frame 80 is ready to move by rotation to index the next compression die 100 for loading. When the frame 80 rotates, the end plates 32 and 34 become the cylinder means for the loaded die 100.

At the completion of the loading of the precompression and compression cylinders, and upon the retraction of the auger 150, there may be some particulate matter disposed within the aperture 66 as the gate 64 moves downwardly. This has been discussed above. The particulate matter disposed within the aperture 66 simply moves downwardly and remains within the aperture, with the end wall of the cylinder 90 acting as a cylinder head for the miniature cylinder defined by the aperture 66 on one side, and the head plate or block 22 defining a cylinder head on the opposite side, (see FIG. 2). The particulate matter remains within the aperture 66 until the hydraulic cylinder 60 is actuated to retract the rod 62 and to once again align the aperture 66 with a new compression die 100 to begin a new loading cycle. The beginning of a new load cycle, after the completion of the compression step, as shown in FIG. 8, is illustrated by returning again to FIG. 4. The particulate matter then disposed within the aperture 66 is moved into the bore 102 and the bore 174 of the cylinders 100 and 170, respectively, as the auger 150 begins another load cycle.

Figure 9:
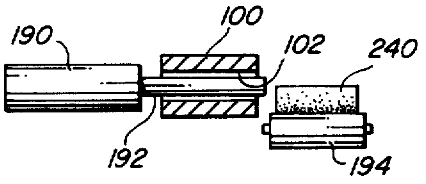
FIG. 9 is a schematic representation of the removal of a cured particulate block from the apparatus of the present invention.

At the conclusion of the compression process, and the curing process, the compressed particulate material within the tapered bore 102 of a compression die 100, the frame 80 rotates away from, or beyond, the ends 38 and 40 of the outer plates 32 and 34, respectively. This allows a completed and cured particulate log 240, shown in FIGS. 9 and 10, to be removed from a compression die 100. The removal of the cured particulate log 240 is schematically illustrated in FIG. 9.

A hydraulic cylinder 190 is shown disposed adjacent to the compression cylinder 100. The cylinder 190 includes a piston rod 192 which is aligned on the longitudinal axis of the bore 102. When the hydraulic cylinder 190 is actuated, the piston 192 moves outwardly, away from the cylinder 190, and into the bore 102 where it contacts one end of the cured log 240. The rod 192 then moves or pushes the cured particulate log 240 out of the bore 102 of the compression cylinder 100, and onto the conveyor 194. The log 240 is then conveyed away from the particulate compression apparatus 10 to a loading area or packaging area, as desired. The completed and cured particulate log 240 is illustrated in FIG. 10, which comprises a perspective view of the log 240. It will be noted that the particulate log 240 comprises a tapered cylindrical log with the diameters of opposite ends of a log differing. The taper of the log is due to the taper of the interior bore 102 of the compression die 100, best shown in FIG. 2. The diameter of the inlet mouth 104 is greater than that of the rear mouth 106 to allow for the compression of the particulate matter from the precompression cylinder.

Figure 11:
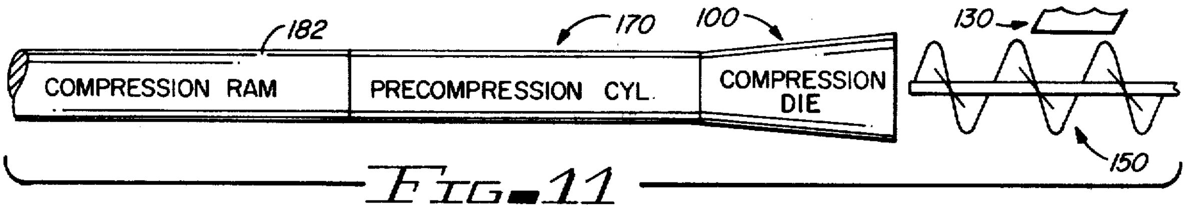
FIG. 11 is a schematic representation of the feeding precompressing and compressing steps of the apparatus of the present invention.

FIG. 11 comprises a schematic representation of the basic elements incorporated in the apparatus of the present invention, as discussed above in conjunction with FIGS. 1–8. Two cylinders, a compression die 100 and a precompression cylinder 170 are disposed in coaxially aligned relationship for loading with particulate matter. Particulate matter is fed from a feed supply tube 130 to a load auger 150. The load auger 150 moves the particulate matter into both the compression cylinder and the precompression cylinder by a combination of rotary and axial movement of the load auger 150. The inward movement of the load auger 150, with respect to the axial length of movement of the auger 150 is determined by either a preload force (back pressure) which limits the inward movement of the auger, or else by the length of axial travel of the auger, whichever comes first. That is, the auger can never force itself against the end of the compression ram 182 at the distal end of the precompression cylinder 170, remote from the compression die 100. Rather, the inward limit of travel of the auger 150 is the distal end of the precompression cylinder 170. However, if the force or pressure built up by the particulate matter within the precompression cylinder 170 reaches a predetermined maximum before the auger 150 reaches the axial limit of its travel, the inward travel of the auger will stop and it will reverse its direction, thus moving out of the precompression cylinder 170 and out of the compression die 100. Since the auger continues to travel in the same direction, it will back out of the same convoluted bore that it made in its inward movement.

With the auger 150 in its full retracted or outward position, the compression ram or piston 182 begins its compression stroke to compress the particulate matter precompressed within the cylinder 170 and the cylinder 100 to the final compression density of the particulate matter within the compression die 100. The taper of the compression die 100 allows the particulate matter to be compacted within the compression die without voids, etc., and without causing or allowing hard and soft spots within the particulate matter. The particulate matter is accordingly uniformly compacted or compressed.

The compression ram or piston 182 also has two limits with respect to its inward or compression stroke. It is limited first by its axial length. Thus, the extent of the axial travel of the piston 182 allows it to move only through the precompression cylinder 170, and not into the compression die 100. However, if a predetermined force or pressure (back pressure) of the particulate matter is exerted on the ram 182 prior to the full length of its travel, it will cease its stroke and maintain its position until its hydraulic actuator retracts the piston or ram 182 out of the compression cylinder after the compression die just loaded is moved away from alignment between the precompression cylinder 170 and the load cylinder 140 and its auger 150. If the compression ram 182 does not extend its full length, then the particulate matter compressed between the end of the compression ram 182 and the compression die 100 simply remains in position as the frame 80 rotates the loaded compression cylinder away from alignment with the precompression cylinder and the load tube 140 and auger 150. The particulate matter thus disposed within the precompression cylinder 170 becomes part of the particulate matter for loading into the next compression die 100 that is indexed for loading.

While the bore 102 of the compression cylinder or die 100 discussed in conjunction with FIGS. 1-11 has been generally cylindrical, it is obvious that the configuration of the compression die bore may be any desired configuration. Four different cross-sectional configurations are illustrated in FIGS. 12A, B, C, and D.

Figure 12:
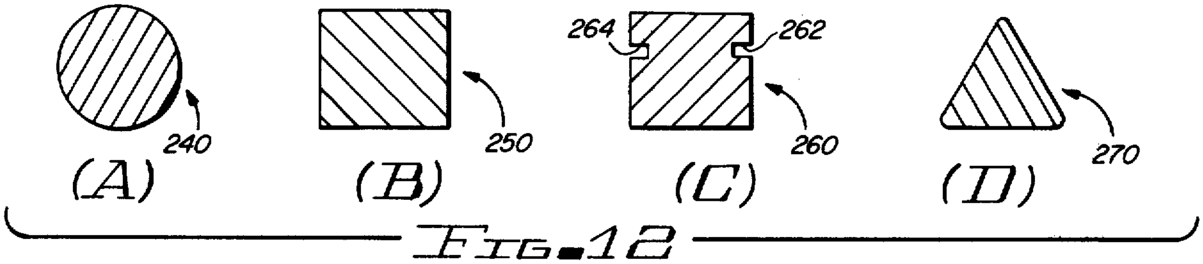
FIGS. 12A, B, C, and D are schematic representations of various cross-sectional configurations usable with the apparatus of the present invention.

The generally circular configuration of the log 240 is shown in FIG. 12, along with three other cross-sectional configurations, a generally square configuration 250, a generally square configuration 260, with a pair of axially extending grooves 262 and 264, and a triangularly shaped configuration 270. The precise cross-sectional configuration to be employed in a particular die depends on a number of factors, including the type of particulate matter to be compressed, the use to which the finished product will be put, etc.

The cross-sectional configuration of the compression die, the precompression cylinder, and the compression piston or ram, of course, will be in accordance with the desired cross-sectional configuration of the end product, whether it be a cylindrical log, a rectangular block, etc. The auger which feeds the particulate material into the precompression and compression chambers will, of course, continue to be round, with its overall diameter correlated to the appropriate dimensions of the particular cross-sectional configuration of the precompression and compression cylinders. It will be noted that, in the above discussion, and also in the following discussion, except for the illustrations of FIG. 12, all of the embodiments utilize generally cylindrical dies. Accordingly, the term "diameter" and any other specific term should be considered as referring to width, height, etc., with respect to non-circular cross-sectional configurations, as applicable.

While the cylindrical configuration, such as the log 240, may be preferred for many uses, such as fuel logs, etc., the cylindrical configuration does not lend itself well for stacking and shipping purposes. For stacking and shipping, a square or rectangular configuration may be preferred, such as shown in conjunction with reference numerals 250 and 260 in FIG. 12. For other applications, a triangular corss-sectional configuration, such as designated by reference numeral 270, may be employed.

The particulate matter for which the apparatus of the present invention may be employed is not limited to wood products, such as sawdust, wood chips, etc. Coal dust, coal lumps, or combinations thereof, or combinations of coal and wood, may be employed with the apparatus of the present invention. Also, feed products for livestock may also be compressed into logs or blocks. With some types of particulates, the heating and cooling of the particulate matter may be reversed from that discussed above and disclosed in conjunction with the apparatus of FIGS. 1-3. For example, for feed products, it may be desirable to have the particulate matter unheated or cold during the loading and compression stages, with heating accomplished during the curing period. The blocks or cubes of compressed feed are generally impervious to moisture, may be stored virtually indefinitely, and are convenient for storage purposes. The grooves 262 and 264 on the block 260, shown in FIG. 12C, may be incorporated into the dies used for feed products. The grooves 262 and 264 define hand holds or finger holds to allow the blocks or cubes to be handled prior to being reconstituted for feed.

As pointed out above, different types of particulate matter may be compressed or compacted by the apparatus of the present invention. The apparatus of the present invention is accordingly not limited to particulate matter designed to provide only logs for burning in fireplaces, and the like, and made from sawdust, wood chips, or the like. Materials other than wood may be used. Moreover, the apparatus and process is flexible enough so that different types of wood products may be utilized for the compacting of particulate matter. For example, in addition to sawdust and wood chips, both of which have been discussed above, bark, leaves, or other wood products, or any combination thereof, may be utilized in the apparatus of the present invention. Furthermore, as has also een discussed, coal dust, or pulverized coal, etc., may be utilized as the particulate matter to be compacted into a cylinder or a block. Or, in the alternative, combinations of coal and wood products may also be utilized in the apparatus of the present invention to produce fuel cylinders or blocks.

It will be noted that all of the types of particulate matter discussed in the preceding paragraph relate to fuel. The products thus derived from coal or wood particulates are probably in the configuration of a cylinder, such as illustrated in FIG. 10 and in FIG. 12A, having a generally circular cross-sectional configuration, and generally cylindrical, albeit a tapered cylinder. However, there may be advantages in having triangular "logs" or some other configuration.

It will be noted that only heat and pressure are utilized in the apparatus of the present invention. No binder is necessary to produce the finished particulate product. In addition to the material designed for burning, as discussed above, various types of animal feed, or fodder, as mentioned earlier, may also be used with the apparatus of the present invention to provide feed blocks, such as shown in FIGS. 12B and C and denoted by reference numerals 250 and/or 260. The feed blocks produced by the apparatus of the present invention are of a generally high density, on the order of about 1.54 or greater. The high density blocks must be reconstituted before becoming feed for animals. The blocks with the density as discussed herein will not degenerate and are generally impervious to water, etc.

With storage in shipping as prime consideration for the finished product of the apparatus of the present invention, the concept of utilizing cross-sectional configurations other than circular becomes of substantial importance. This has been discussed above in conjunction with FIG. 12. However, there is another consideration with respect to the utilizing of the apparatus of the present invention for compressing feed products for animal food in other than circular cross-sectional configurations. That consideration is the place in the compression cycle for heat.

As discussed above in conjunction with FIGS. 1-11, and primarily in connection with FIG. 3, the heat is applied during the loading and the compression portion of the cycle, and the compressed particulate matter is then cooled during the rotation of the frame 80 while sequential unloading and loading of the various compression dies takes place. For preparing feed blocks, the particulate matter is preferably not heated during the loading and compression cycles. The heat accordingly is applied to the compression dies during the curing cycle, which occurs during the rotation of the frame 80 from the loading of each compression cylinder to the unloading of each compression cylinder. Moreover, the dies themselves, into which the cold particulate matter is fed, may be heated during the loading cycle.

For feed, such as alfalfa, and the like, the particulate matter is preferably fed cold (unheated) into hot dies, and heat is applied during the curing time. At some point in time, the dies are cooled prior to the ejection of the cured particulate block (log). For volatile fuels, such as coal dust or powdered coal, the material is loaded cold into cold dies, and heat is applied after the particulate matter has been compacted into the compression die.

The basic process embodied in the apparatus of the present invention, as discussed above, and as will be discussed below, allows hot particulate material to be loaded into hot dies, and the hot dies are then cooled after compression of the particulate material and during the curing cycle. In the alternative, cold material may be loaded into hot dies, compressed, and then heated during curing time and also cooled during the curing time. Finally, cold material may be loaded into cold dies, compressed, and heat is then applied during the curing cycle. Cooling will occur after the heating or cooling portion of the cycle.

Figure 13:
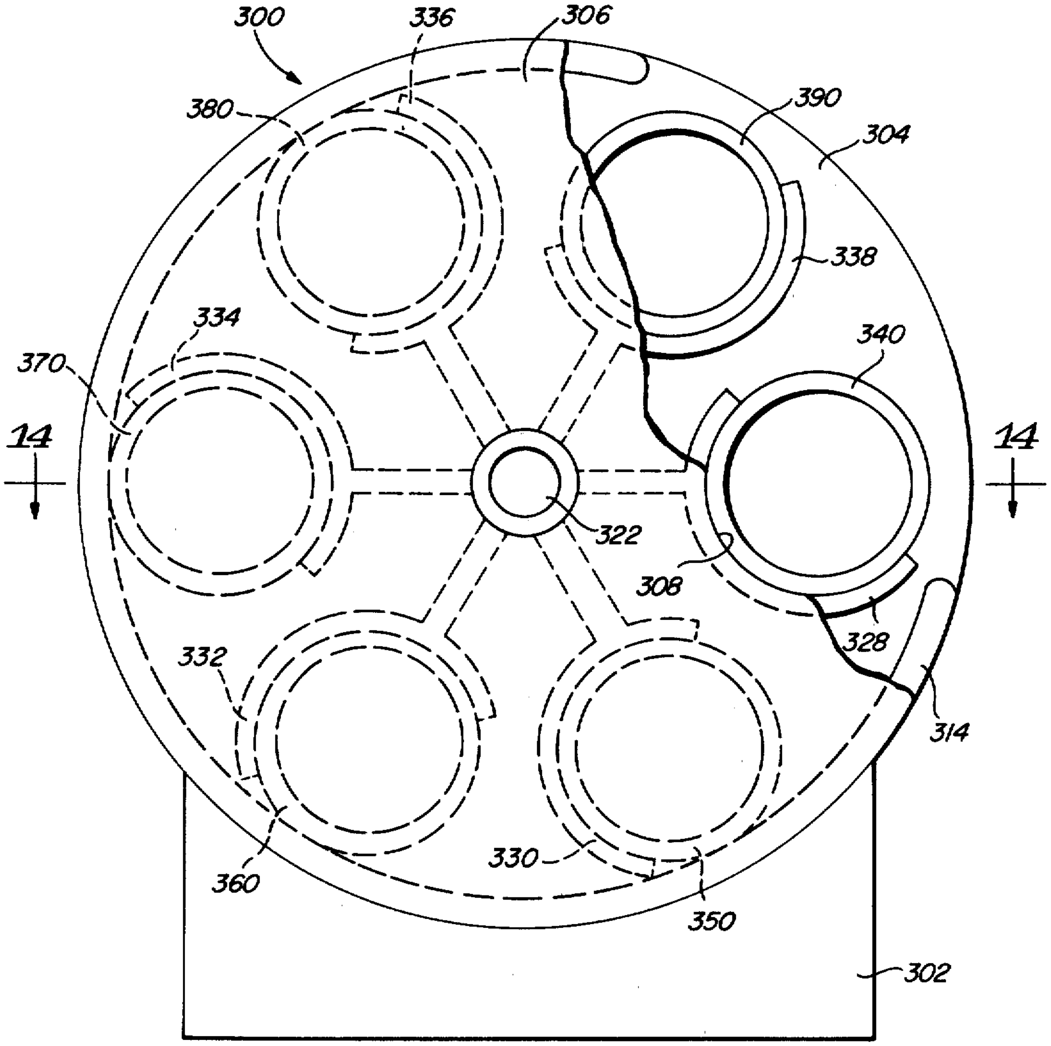
FIG. 13 is a top view of an alternate embodiment of the apparatus of the present invention.
Figure 14:
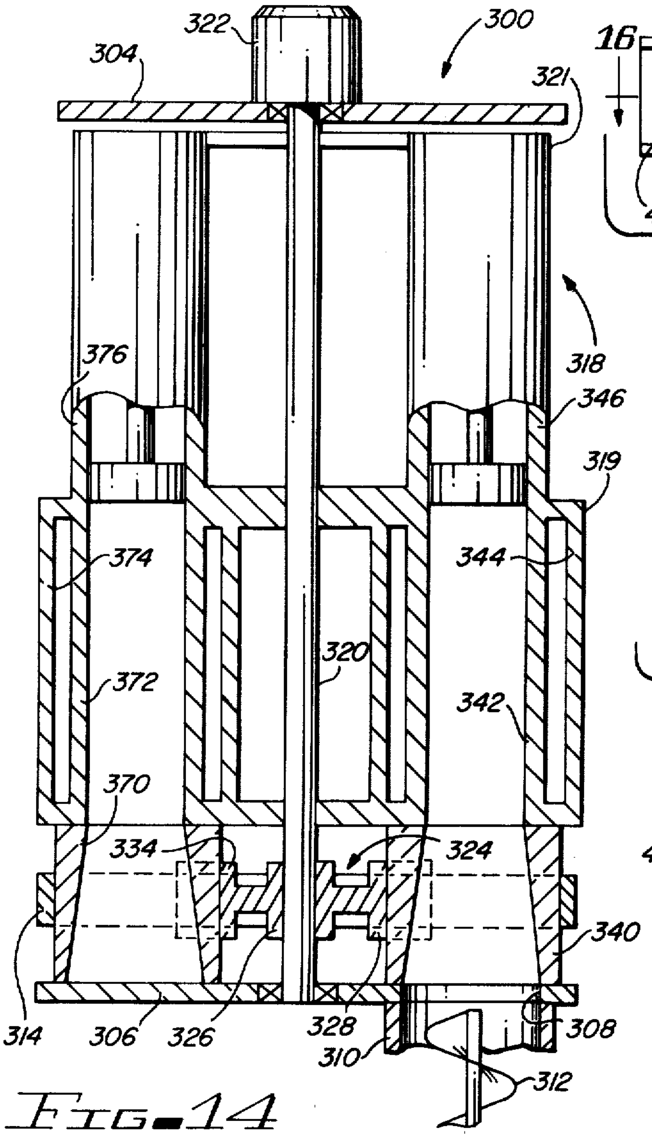
FIG. 14 is an end view of the apparatus of FIG. 13.

FIGS. 13 and 14 comprise alternate embodiments of the apparatus of the present invention. FIGS. 13 and 14 are schematic representations of particulate compression apparatus 300 embodying the same general principle as the apparatus 10 of FIGS. 1-9 and 11. The structure of particulate compression apparatus 300 is different from that of particulate compression apparatus 10, but the general concept remains the same. Particulate matter or material is first precompressed and then is compressed, using both a precompression cylinder and a compression cylinder or die. The material is ultimately compressed into a compression cylinder or die prior to curing. Again, as discussed above, cold feed or hot feed (particulate matter) may be loaded into the cylinders, which in turn may be either hot or cold, with heat applied during or as part of the curing cycle, if desired. The dies are cooled, of course, prior to unloading the dies.

FIG. 13 is an end view of particulate compacting apparatus 300, comprising an alternate embodiment of the apparatus of the present invention. FIG. 14 is a longitudinal top view in partial section of a portion of the apparatus 300, taken generally along line 14—14 of FIG. 13. For the following discussion, reference will be made to both FIGS. 13 and 14.

The particulate compression apparatus 300 includes a base 302 and a pair of fixed end plates 304 and 306 which are appropriately secured to the base 302. The end plate 306 includes an aperture 308.

Aligned with the aperture 308 is a loading tube 310. Within the loading tube 310 is a rotating auger 312. The feed tube 310 and the auger 312 may be substantially identical to the loading tube 140 and the auger 150, as discussed above in conjunction with the particulate compression apparatus 10. A hopper, not shown, may be appropriately secured to the loading tube 310 for providing a steady flow of particulate matter to be loaded into compression dies and precompression chambers by the auger 312.

Appropriately journaled for rotation on the base 302 and between the fixed end plates 304 and 306 is a rotor 318. The rotor includes a shaft 320 which is appropriately journaled for rotation on the end plates 304 and 306 of the base 302.

Secured to the end plate 304 and coupled to the shaft 320 is a motor 322. Actuation of the motor 322 results in rotation of the shaft 320 and of three rotor assemblies secured to the shaft. The three assemblies or portions of the rotor 318 includes a cup or die holder assembly 324, a precompression assembly 319, and a hydraulic compression cylinder assembly 321.

The die holder assembly 324 includes a holder for each compression die. In the apparatus 300, six dies are illustrated. Accordingly, the die holder assembly includes six holders, each of which comprises a cup which extends arcuately for about one hundred eighty degrees. Each cup is connected by a web to a central hub 326 secured to the shaft 320. As best shown in FIG. 13, the arcuate length of each cup or holder is not symmetrical with respect to its web. Rather, the cups are consistently skewed for purposes of loading and unloading dies.

Dies are loaded onto the rotor 318 when an empty cup is aligned with the aperture 308 in the end plate 306. The dies are both loaded into the rotor and loaded with particulate material at the same location, which may be referred to as the loading station. In FIGS. 13 and 14, a die 340 is shown disposed on a cup or holder 328 at the loading station. The bore or compression chamber of the die 340 is aligned with the loading tube 310 and is ready to receive particulate material. The dies may be aligned on an appropriate conveyor, not shown, for sequential movement onto a cup or holder of the rotor 320. The conveyor is necessarily disposed adjacent to the rotor and the end plate 306 at the aperture 308 so that a die may simply be rolled onto the roller.

Since dies are separate from the rotor, they must necessarily be removed from the rotor just prior to the alignment of a particular cup with the aperture 308. With six dies on the rotor 320, the unloading station is located sixty degrees prior to the loading station. In FIG. 13, a die 390 is shown at the unloading station, actuating removal from its cup or holder. Any appropriate element or system may be used to remove a die from the rotor. The removal of a die and the insertion of another die preferably occurs substantially simultaneously. The total loading process, which includes both inserting a "fresh" die onto the rotor and loading the die with particulate material, obviously takes more time than does the removal of a die from the rotor. When a die is removed from the rotor, the compacted particulate element, whether a cylindrical log, or otherwise, may be removed from the die at a remote location, as desired. The die may be inserted into an appropriate holder die for removal of the particulate element by a hydraulic piston, as schematically illustrated in FIG. 9.

A strap 314 extends about the cup or holder assembly for an arcuate distance of about two hundred eighty degrees, beginning at the lower end of the loading station and terminating at the upper end of the unloading station. The strap is secured to the base 302. The purpose of the strap is to hold the dies in their cups as the rotor 318 rotates. The gap of about eighty degrees in the strap allows the dies to be removed from and inserted onto the rotor.

The rotor 318 also includes a plurality of precompression chambers and hydraulic compression cylinders secured to the shaft 320 and aligned with the cup assembly 324. Since there are six cups for six compression dies, it follows that there are six precompression cylinders and six hydraulic compression cylinders for the six dies. As shown in FIG. 14, the precompression and compression units are generally aligned with the compression dies. The three systems work together during the course of the particulate compaction process.

Six compression dies 340, 350, 360, 370, 380, and 390 are disposed in their respective holders or cups, shown either in phantom or in part in FIG. 13. The die 340 and the die 370 are shown in partial section in FIG. 14, disposed in their respective holders or cups 328 and 334.

Aligned with the dies or compression cylinders 340 and 370 are precompression cylinders 342 and 372, respectively. Jackets 344 and 374 are disposed about the precompression cylinders 342 and 372, respectively, for heating or cooling purposes, as desired. Heating or cooling media may be circulated in the space between cylinders and the jackets as is well known and understood.

Secured to the precompression cylinders, and axially aligned therewith, are hydraulic compression cylinders. Each hydraulic compression cylinder includes a piston or ram which compresses the particulate material in the precompression and the compression cylinder or die. A hydraulic cylinder 346 and a hydraulic cylinder 376 are shown secured to the cylinders 342 and 372, respectively. The precompression cylinders and the hydraulic cylinders are appropriately secured to the shaft 320. Not shown are the appropriate controls for the hydraulic cylinders and for the heating/cooling media for the precompression cylinders, the hydraulic lines, connections, etc., all of which are known and understood.

The rotor 318 rotates in increments of sixty degrees. During each pause after a rotary movement, a loaded die, with a compacted, cooked, cooled, and cured particulate element in the die, is removed from its holder at the discharge station. A "new" or empty die is loaded onto an empty holder at the same time as the loading station. These steps may best be understood by reference to FIG. 13, where die 390 is shown at the discharge station, ready for removal, and die 340 is shown on its holder 328 at the loading station, ready for charging or loading with particulate material.

After the die is disposed on its cup or holder, the auger 312, as shown in FIG. 14, commences its inward travel through the aperture 308 in the end plate 306 to load both the chamber of the compression cylinder and the chamber of the precompression cylinder with particulate material. The loading or charging process is substantially the same as discussed above in conjunction with the particulate compacting apparatus 10, including the back pressure limits or linear travel limits of the auger 312.

The rotor 318 rotates another sixty degrees after the auger is retracted from the compression chamber. The fixed end plate 306 then becomes the cylinder head for the compression chamber. With the end plate 306 covering the end of the compression chamber, the hydraulic cylinder is actuated to compact the particulate material in the precompression chamber and in the compression chamber. The hydraulic cylinder maintains its pressure for a predetermined time during the rotation of the rotor. Appropriate heating, or cooking, and cooling of the particulate material is accomplished to insure that the particulate element within the compression chamber or bore of the die is cured by the time the die is removed at the unloading station.

The action of the hydraulic cylinders, with respect to a back pressure limit or to a linear limit of travel, is substantially as previously discussed.

The end plate 306 comprises a fixed end plate for all of the compression dies. After the loading operation is accomplished, and the appropriate preload or back pressure limit reached or end of travel reached by the auger 312 during the filling step, the auger 312 retracts out of the precompression cylinders and the compression cylinders and the rotor 318 then rotates sixty degrees to remove the open end or inlet mouth of each compression cylinder or die away from registration with the feed aperture 308. The end plate 306 then acts as a cylinder head for the compression chambers and the compression of the particulate matter commences. It may be seen that the delay time or waiting time for the rotor 318 is reduced when the loading and compressing steps are carried on sequentially with an intervening move or rotation of the rotor 318. Thus, instead of remaining at the feed station during both the feeding and compression steps, the rotor 318 moves after each loading step and the compression step takes place later, after the die is rotated away from the feed aperture 308. In this manner, the end plate 306 acts as a cylinder head for each of the compression dies during the compression and curing steps.

While the rotor 330 is shown as including six compression units, each unit of which consists of a compression die, a precompression cylinder, and a hydraulic cylinder or actuator, it is obvious that any number of units, as may be convenient, practical, or desired, may be included in a rotor. Moreover, while the cross-sectional configuration of each die is shown as circular, it is obvious that any other cross-sectional configuration, such as shown in FIG. 12, may be used.

Figure 15:
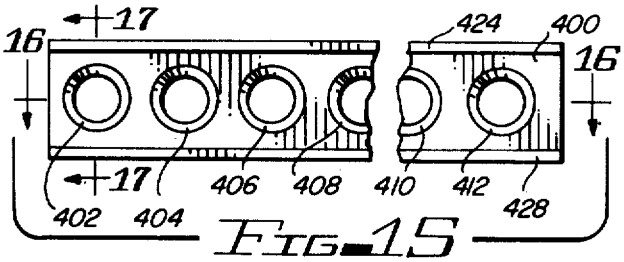
FIG. 15 is an end view of an alternate embodiment of a portion of the apparatus of the present invention.
Figure 16:
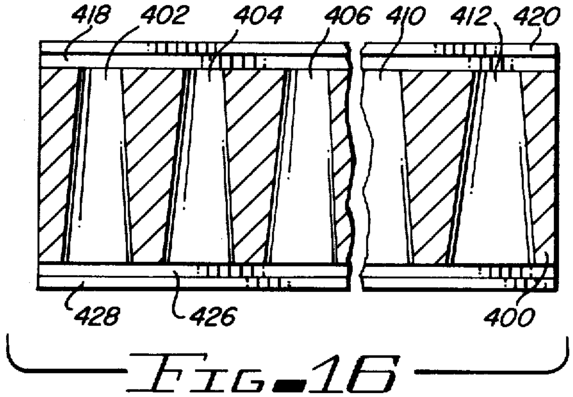
FIG. 16 is a view in partial section of the apparatus of FIG. 15, taken generally along line 16—16 of FIG. 15.
Figure 17:
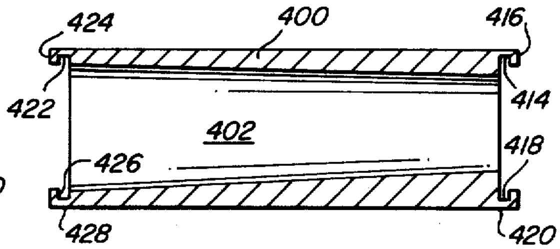
FIG. 17 is a view in partial section of the apparatus of FIG. 15, taken generally along line 17—17 of FIG. 15.

FIG. 15 is a side view of a multiple die block 400. FIG. 16 is a view in partial section of the multiple die block 400 of FIG. 15, taken generally along line 16—16 of FIG. 15. FIG. 17 is a view in partial section of the die block 400 of FIG. 15, taken generally along line 17—17 of FIG. 15. Reference will be made to FIGS. 15, 16, and 17 in the following discussion. A generally rectangularly configured block 400 is shown in FIGS. 15, 16, and 17. Extending through the block 400 are six tapered compression dies or chambers 402, 404, 406, 408, 410, and 412. The die block 400 accordingly contains multiple compression chambers. Rather than each die or cylinder being a single unit, as included in the particulate compression apparatus 10 and the particulate compression apparatus 300, discussed above, a single block 400 may be used when an apparatus configuration other than that of a rotating wheel arrangement, such as used for apparatus 10 and apparatus 300, is desired. The compression die chambers 402 . . . 412 are illustrated as having a circular cross section, but it is obvious that any appropriate cross-sectional configuration may be used, such as illustrated in FIG. 12.

For a single block to be used to house or to contain a plurality of dies or chambers, plates are needed to close the bores after loading, during compression, and during the curing steps. Accordingly, four slots 414, 418, 422, and 426 are shown extending longitudinally with respect to the block 400, or substantially perpendicular to the axial length of each chamber bore. The slots are adjacent to, or defined by, webs or flanges 416, 420, 424, and 428, respectively. The webs or flanges and slots are best shown in FIG. 17.

Figure 18:
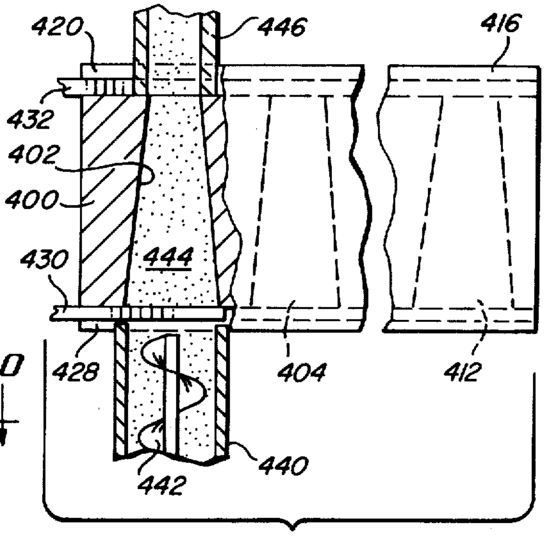
FIG. 18 is a view in partial section illustrating the employment of the apparatus of FIG. 15 is an alternate embodiment of the apparatus of the present invention.

FIG. 18 is a top view, with a portion in partial section, of the die block 400 of FIGS. 15, 16, and 17, illustrating the loading of the bores in the die block and the employment of plates in the slots to act as cylinder heads or compression heads for each of the die bores. FIG. 18 comprises a top view of the die block 400, with the bore or chamber 402 filled with particulate matter 450. The die chamber 402 is shown filled with particulate matter 444 from a load cylinder or tube 440 and an auger 442 disposed within the tube 440. The load tube 440 is shown disposed adjacent to the relatively wide feed mouth of the die bore 402. A precompression cylinder 446 is shown disposed adjacent to the relatively narrow mouth of the die bore 402.

During the load or feed procedure, as discussed above in conjunction with the previous embodiments, the feed tube 440 is aligned with the bore 402, and the auger 442 rotates and moves inwardly, carrying particulate matter 444 into the bore or compression chamber and into the precompression cylinder. At such time as a predetermined pre-load or back pressure is achieved, or the end of the "inward" stroke of the auger is reached, the auger reverses direction and backs out of the precompression cylinder and the compression bore to the position shown in FIG. 18. When the auger 442 is completely retracted from the block 400, and from the chamber or bore 402 therein, a plate 430 is moved laterally with respect to the block 400 within the grooves 422 and 426. The grooves act as guides and retainers for the plate 430. When the plate 430 closes the end of the cylinder or die 402, it acts as a compression head for the die, to perform substantially the same function as the gate 64 discussed above in conjunction with the particulate compression apparatus 10, or as the end plate 306 acted with respect to the particulate compression apparatus 300.

Another plate 432 extends through the slots 414 and 418 and is disposed against the precompression cylinder 446 which is in turn disposed against the wall of the die 400 and substantially coaxially with the arrow end or mouth of the bore 402. The plate 432 preferably includes a semi-circular recess or concave recess which is disposed about the adjacent portion of the precompression cylinder 446. The plate 432 may be relatively fixed in place during the loading sequence of the block 400, as will be discussed below. Similarly, the precompression cylinder, along with a hydraulic compression cylinder (not shown) secured to the precompression cylinder, may be fixed in place. The plate 430, however, moves during the loading and compressing sequence, as has been discussed.

The compression piston (not shown) begins its compression stroke to compact the particulate matter 444 within the precompression cylinder 446 and the die 402. At such time as the compression piston reaches its inward limit, or its predetermined back pressure, whichever comes first, the die block 400 is moved laterally to index the next sequential compression die or bore 404 with the load tube 440 and the precompression cylinder 446. During the lateral movement of the die block 400, the plate 430 moves with the die block, while the plate 432 remains fixed with respect to the die block 400 and the precompression cylinder 446, and accordingly the block 400 moves relative to the plate 432 to close the narrow end of the bore 402 after compression or compaction is completed. The plate 432 then acts as a cylinder head for the bore or die 402.

The sequential loading and compression of the dies or chambers 404, 406, etc., takes place as described in conjunction with the bore 402. It will be noted that the plate 430 moves incrementally during the load sequence to cover the wide mouth of each bore after the loading step or sequence is completed and the tube 440 is retracted from between the grooves 422 and 426. The plate 430 then moves with the block 400 after the compression step and as the next bore is aligned with the load tube and the precompression cylinder.

When the last die 412 in the block 400 is loaded and compressed, the plates 430 and 432 completely close the ends of the block 400 and define heads for the dies or chambers. The plates then move with the block 400 as it moves to a cooking station.

Figure 19A:
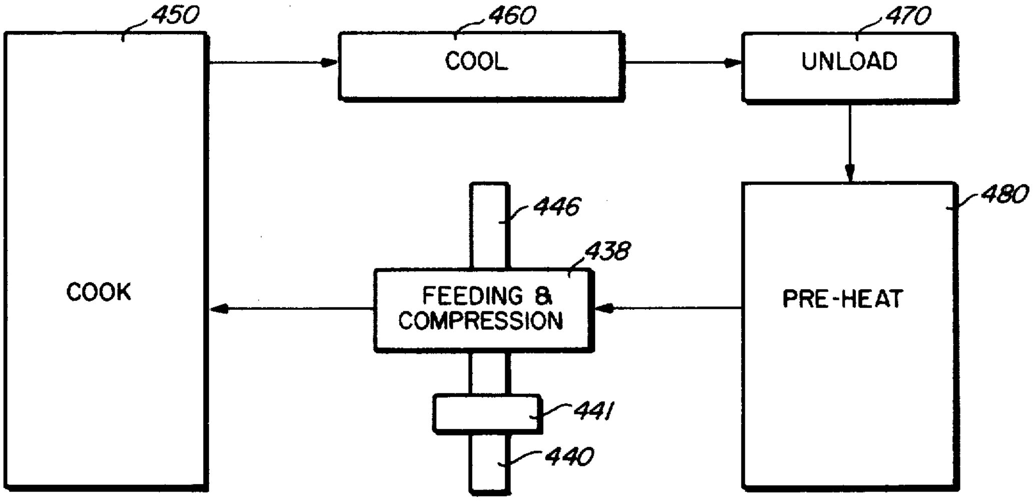
FIG. 19A is a schematic representation of a flow or process diagram utilizing the apparatus of FIGS. 15 and 18.

FIG. 19A is a block diagram illustrating the steps involved in the loading, curing, emptying, and preload heating of multiple die blocks, such as the die block 400. The block 400 lends itself well to the loading of edible materials which are preferably cold when they are loaded into the compression dies. The individual die blocks may be preheated prior to loading at a pre-heat area 480. During the curing period or stage in the formation of particulate blocks or logs, it may or may not be necessary to add additional heat. Obviously, additional heat may be added if necessary. If unnecessary, then only the residual heat from the preheat cycle is used to "cook" the particulate matter compressed or compacted within each die block.

The unloading or emptying of a cured particulate element may be accomplished at a station 470 where the plates 430 and 432 are removed. The dies may then be emptied one at a time, if desired, using sequential movement of a single block to align each bore or die with an unloader piston or ram. In the alternative, a battery of unloading pistons or rams may be used to empty all of the bores in a single block at once.

After unloading, the blocks go through a preheat cycle while the plates are returned to the feed station for reuse. The individual die blocks are reheated during the preheat cycle and are returned to the loading station for sequential loading of the individual chambers or bores in the block.

Individual die blocks are fed to the feeding and compression area 438, where the individual dies or cylinders in each block are aligned with the feed tube 440 and the precompression cylinder 446, as shown in FIG. 18. The compression cylinder 446, for purposes of FIG. 19A, also includes a hydraulic compression cylinder, piston, etc. A hopper 441 is schematically represented as disposed adjacent to the load tube 440.

After the sequential compression of particulate matter into each of the dies or bores in a single die block, the die block, with its end plates acting as cylinder heads for the individual bores or dies within the block secured thereto, move to a cooking area 450. The cooking area may be nothing more than an area through which the individual blocks pass during the cooking stage of the compaction process, or it may be an area where additional heat is added, if required.

From the cooking area 450, the die blocks then move to a cooling area 460. The curing process for the particulate matter within the individual dies in each block has been accomplished prior to arrival at the cooling station area 460. The die blocks are cooled in an appropriate manner, such as by water, or the like, at the cooling station 460.

Upon passing through the cooling station 460, the blocks then go to an unload station 470. At the unload station 470, the end plates, such as the end plates 430 and 432, shown in FIG. 18, are removed from each block and are transmitted back to the feed and compression station for reuse. The individual compressed and cured particulate logs or blocks are removed from the die block at the unload station, and the unloaded, empty blocks then proceed to the preheat station 480. The particulate elements go their own way for packaging, shipping, storage, etc.

At the preheat station 480, the compression blocks are heated prior to being transmitted to the feed and compression station 438 for reloading. The preheat station may raise the temperature of the blocks to any desired temperature, appropriate for the particulate matter being compressed or compacted therein. Since the blocks are preferably made of solid metal, the residual heat available within the block for cooking purposes is substantial.

While each of the stations shown in FIG. 19A are of different sizes, the difference in size is not related to the length of time that a block stays at any one station, or to the length of time that it takes an individual block to pass through a particular station. Rather, the blocks are simply used to illustrate the sequential steps involved or available for a typical application of multiple dies disposed within a single block. Any appropriate conveyor system may be used for the blocks.

While the apparatus of FIG. 19A has been discussed in conjunction with the feeding of cold particulate matter into hot dies, it may be understood that multiple die blocks may also be used for the feeding of hot particulate matter into the dies. Moreover, if it is desired to feed hot or cold material into either heated or unheated dies, the multiple dies may be used, with simply an appropriate change in the process diagrammed in FIG. 19A. For example, if the dies do not need to be preheated prior to loading, the preheat station 480 may be either omitted, or, if the layout is fixed, then no heat need be applied as the dies move through the preheat stage or area 480.

Figure 19B:
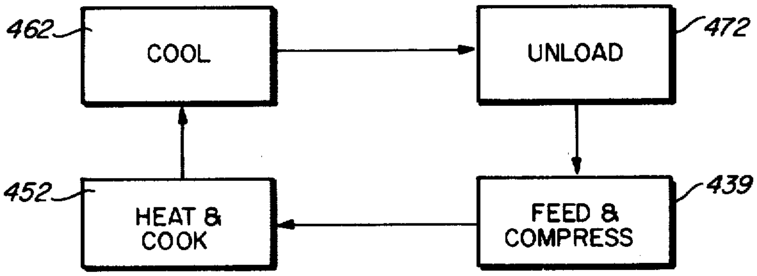
FIG. 19B is a schematic representation of an alternate embodiment of the process of FIG. 19A.

FIG. 19B is a schematic diagram illustrating an alternate process from that shown in FIG. 19A, in which the pre-heat stop is omitted. Accordingly, the pre-heat station or area is omitted from FIG. 19B.

Feeding and compressing is accomplished at a station 439, which may be substantially identical to the feeding and compression station 438 of FIG. 19A, and as described in conjunction with FIG. 18. The die blocks arriving at the feeding and compression station 439 are relatively cool, however, after unloading and without any pre-heating.

From the station 439, the die blocks move to a heating and cooking station 452, where heat is applied to the blocks. The particulate material, loaded "cold" into "cold" dies, is subject to heat for the first time in the process at station 452.

After an appropriate length of time at the station 452, sufficient to allow the compacted particulate matter to "relax" in its pressurized state, the blocks move to a cooling station 462. The cooling station 462 may be substantially identical to the cooling station 460 of FIG. 19A.

The blocks move to an unloading station 472 from the cooling station 462. The unloading station 472 may be substantially identical to the unloading station 470, as described above.

Without a pre-heat step required, the unloaded blocks move back to the feeding or loading and compressing station 439 to repeat the compacting process.

Figure 21:
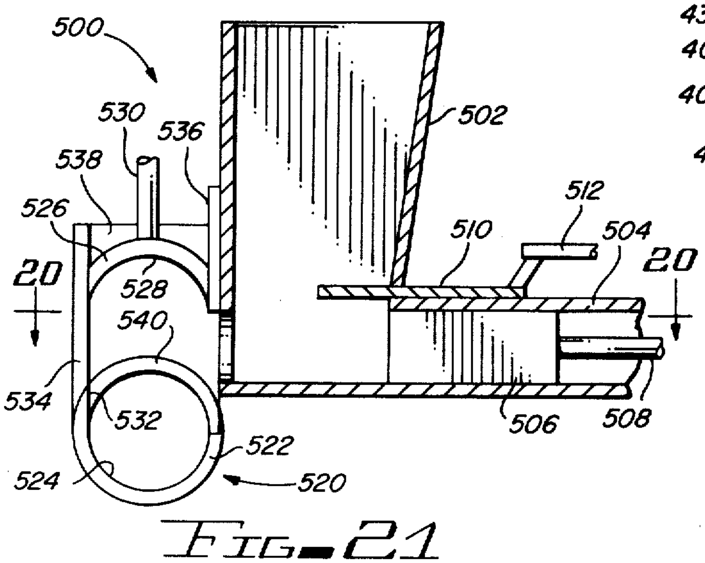
FIG. 21 is a view in partial section of the apparatus of FIG. 20 taken generally along line 21—21 of FIG. 20.
Figure 20:
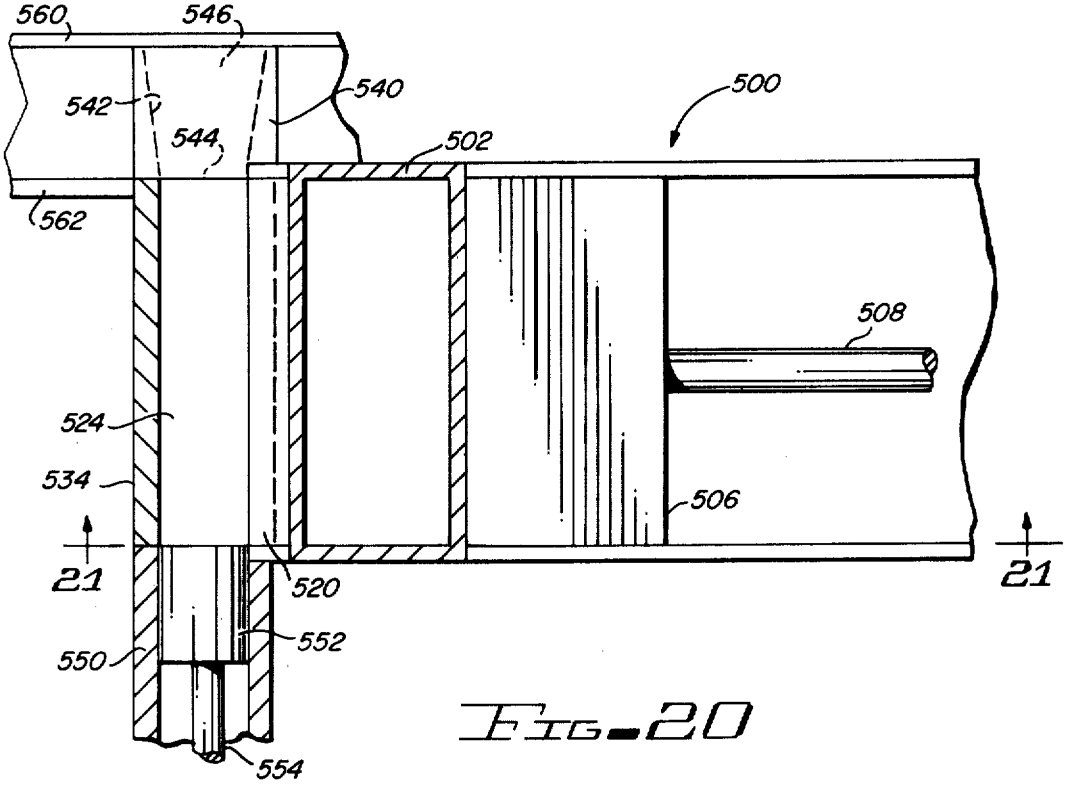
FIG. 20 is a top view in partial section of a portion of an alternate embodiment of the apparatus of the present invention.

In all of the above embodiments, the general configuration of the loading and compressing step has been that shown in FIG. 11. In FIG. 11, loading is accomplished from one side of a die, and compression, including precompression, from the opposite end of the die. For some circumstances, it may be preferable to have both the loading and the compressing, including precompressing, accomplished from only one side. In such situations, apparatus such as disclosed in FIGS. 20 and 21 may be used. When the loading of a die and the compression are both accomplished from one end of the die, the use of a feed auger or screw may be eliminated and a single piston or ram may be used for both precompression and compression. One embodiment of such apparatus is shown in FIGS. 20 and 21. FIG. 20 comprises a top view in partial section of particulate compression apparatus 500, taken generally along line 20—20 of FIG. 21. FIG. 21 comprises an end view in partial section of a portion of particulate compression apparatus 500 of FIG. 20, taken generally along line 21—21 of FIG. 20. For the following discussion, reference will be made to FIGS. 20 and 21.

The particulate compression apparatus 500 includes a feed hopper 502 disposed above, and communicating with, a load or feed tube 504. The feed or load tube 504 is generally of a rectangular cross section. Within the feed tube 504 is a feed ram 506, which is also of a rectangular configuration for movement within the feed tube 504. The feed ram 506 is moved by appropriate means, such as a hydraulic cylinder, not shown, with a rod 508 connected to the ram 506 and to the actuating cylinder, or the like.

Beneath the hopper 502, and above the tube 504, is a movable plate 510. The plate 510 is connected to a rod 512 for horizontal movement. The rod 512 is connected to an appropriate actuator, not shown. The plate 510 comprises a gate movable between the hopper 502 and the load tube 504 to limit or control the flow of particulate matter from the hopper during the inward or loading stroke of the feed ram 506 and its outward or return stroke.

The movement of the plate or gate 510 is correlated or coordinated with the movement of the ram 506 and with other elements of the apparatus 500, as will be discussed below. The gate 510 is shown in an intermediate position between its open and its closed positions.

After the particulate matter is fed, or flows downwardly, into the tube 504, the gate 510 is actuated to close the hopper 502 to prevent a backflow of some of the matter into the hopper while the ram is moving inwardly to load or charge the precompression chamber, as discussed below.

The feed tube 504 extends to a fixed precompression cylinder 520. The precompression cylinder 520 includes two portions, a lower portion 522 and an upper portion 526 which comprises a movable cylinder segment. The lower, fixed portion 522 includes a cylinder bore 524. The upper, movable cylindrical segment 526 includes a bore segment 528. The upper portion or segment 526 moves in response to an appropriate actuator (not shown) secured to the portion 526 through a rod 530. The upper, movable portion 526 is shown in FIG. 20 in its upper or raised position. When the portion 526 is in its downward position, it fits onto the lower portion 522, and into a cylindrical recess 532 to complete the precompression cylinder 520.

At one side of the precompression cylinder 520, and adjacent to one side of, and extending upwardly from, the recess 532, remote from the feed tube 504, is a guide wall 534. The guide wall 534 serves two purposes. The first purpose is to act as a guide on one side for the vertical movement of the portion 526. The second purpose is to act as a retaining wall for particulate matter as it is pushed into the bore 524 of the cylinder 520 by the feed ram 506. The presence of the wall 534 prevents particulate matter from spilling over or off of the precompression cylinder 520.

A second guide wall 536 extends upwardly from the juncture of the feed or load tube 504 and the hopper 502. The wall 536 is generally parallel to, and above, the guide wall 534. In addition to the side guide walls 534 and 536 an end guide wall 538 extends between the guide walls 534 and 536 and is appropriately secured to them. Another end wall, not shown, is disposed parallel to the end wall 538 and disposed between, and appropriately secured to, the side walls 534 and 536. The four guide walls guide the vertical movement of the upper cylinder segment or portion 526 and act as retaining walls for particulate matter moved into the precompression chamber or bore 524 of the cylinder 520 during the loading process and the downward movement of the cylinder segment 526 for initial precompression of the particulate material.

In axial alignment with the precompression cylinder 520, and best shown in FIG. 20, is a compression cylinder or die 540. The compression cylinder or die 540 includes a tapered bore 542. The bore 542 includes two mouths, a relatively narrow inlet mouth 544, and a relatively wide outlet mouth 546. The diameter of the inlet mouth 544 is less than that of the outlet mouth 546. Particulate matter disposed within the precompression cylinder 520 is moved into the compression cylinder or die 540 through the inlet mouth 544. Upon the completion of the curing process for the cylinder or block of particulate matter, the finished product is removed from the die 540 through the outlet mouth 546. The purpose of the taper is, as discussed above, to allow for the compression of the particulate matter without voids, etc., and to insure that the compaction of the particulate matter is uniform throughout the axial length of the bore 542 of the cylinder or die 540.

It will be noted that the overall length of the precompression cylinder 520 is about three times the length of the compression cylinder 540. The trebling of the length of the precompression cylinder with respect to the compression cylinder or die is similar to the three-to-one compaction ratio discussed above in conjunction with the previous embodiments. However, in the previous embodiments, the precompression cylinder and the compression cylinder were both filled with particulate matter during the feed operation. In the present embodiment of FIGS. 20 and 21, the compression cylinder is not initially charged with particulate matter, but only the precompression cylinder is fully charged. Some particulate matter flows into the compression die bore 524 during the load sequence, but the amount is relatively small. The compression of the particulate matter, accomplished from the same side as the feeding, still results in substantially the same degree of compaction as in the previous embodiments.

When the ram 506 reaches its inward limit of movement, pushing particulate matter into the precompression chamber bore 524, and above the bore within the guide walls, as discussed above, the upper cylinder segment 526 moves downwardly on its closing, precompression stroke. The end wall of the ram 506 acts as a fourth guide wall for the segment 526 during its downward movement. The bore portion 528 defines the compressive end wall during the downward movement. The particulate material loaded into the bore 524, and extending upwardly therefrom, is initially precompressed downwardly. This initial precompression is relatively slight. Obviously, there may be a lateral flow from the precompression bore 524 into the bore 542 of the die 540.

For the compaction of the particulate matter, a hydraulic cylinder 550 is used. The hydraulic cylinder 550 is axially aligned with the precompression cylinder 520 and the compression cylinder 540 and is secured to the precompression cylinder remote from the compression cylinder. Thus, the charging and compressing of the particulate matter are both done from the same side of the compression cylinder 540.

Within the hydraulic compaction cylinder 550 is a piston 552 which is secured to a rod 554. The rod 554 is in turn secured to an appropriate hydraulic actuator, or the like, not shown, for reciprocating movement within the precompression cylinder 520.

As in the previous embodiments, the movement of the piston 552 is a function of either or both distance and back pressure. The piston 552 moves through the bore 524 of the precompression cylinder for its full travel distance unless a predetermined back pressure is achieved. Thus, if the predetermined back pressure against the piston 552 is not reached before the end of the stroke of the piston 552, the piston will be disposed adjacent to the inlet mouth portion 544 of the compression cylinder or die 540. If, however, the predetermined back pressure is reached before the piston 552 extends its full length of travel, then the forward or inward, compressive, movement of the piston 552 will cease.

To serve as cylinder heads for the compression cylinder or die 540 is a pair of plates 560 and 562. The plates 560 and 562 are best shown in FIG. 20. The plate 560 covers the outlet mouth portion 546 of the die 540 when the die 540 is in the charging and compressive position, as shown in FIG. 20. The plate 560 accordingly closes the compression cylinder or die 540 during charging, compression, and later, curing. The cylinder or die 540 may move laterally with respect to the plates 560 and 562, as in the embodiment of FIGS. 15–18, or the die 540 may move in the circular pattern, as with the apparatus of FIGS. 1–14. That is, preferably separate or individual dies are used in the apparatus 500, rather than fixed dies, as in the embodiment of FIGS. 1–14. In the alternative, block dies, such as the block 400 of FIGS. 15–18, may also be used with the apparatus 500 of FIGS. 20 and 21.

When the piston 552 reaches either its predetermined back pressure setting or the end of its axial stroke, which signifies the end of the compression of the particulate matter from within the precompression cylinder 520 to within the compression cylinder or die 540, the die or cylinder 540 may be moved away from its alignment, as shown in FIGS. 20 and 21, with the precompression cylinder 520. When the die 540 moves out of alignment with the precompression cylinder 520, the plate 562 covers the inlet mouth portion 544 of the cylinder or die 540. The plate or wall 562 accordingly acts as a second cylinder head for the die 540, in parallel or conjunction with the plate or wall 560.

The ram 506 retreats after the segment 526 reaches its down position in the recess 532. With the ram 506 retracted, the gate 510 moves or retracts to open the hopper to the tube 504.

If the predetermined back pressure is reached by the piston 552 prior to the end of its stroke, it maintains its position and the die 540 is moved away from alignment with the precompression cylinder 520. The particulate matter remaining between the forward end of the piston 552 and the compression cylinder or die 540 remains in the precompression cylinder and becomes part of the next particulate matter charge placed within the precompression cylinder for ultimate compression into the next die which is then moved into alignment with the precompression cylinde 520. The process is then repeated with respect to the charging of the precompression cylinder 520 from the hopper 502 and the feed tube 504.

When a compression cylinder or die 540 is aligned with the precompression cylinder 520, the upper segment 526, which is movable, moves upwardly, out of the recess 532 of the cylinder 520, to the position shown in FIG. 21. When the cylinder segment 526 is in its full "up" position, the charging ram 506 moves toward the precompression cylinder 520 to provide a charge of particulate matter from the hopper 502 into the bore 524 of the precompression cylinder 520. The particulate matter moves from the feed tube 504 into the bore 524 and the movable cylinder segment 526 then moves downwardly under hydraulic pressure applied to the rod 530. As the rod 530 moves down, the segment 526 returns to its initial position with respect to the precompression cylinder 520.

When the segment 526 is in its full down position, its segment bore 528 defines a continuation of the bore 524, and the segment 526 becomes a part of the cylinder wall of the precompression cylinder 520. As discussed above, part of the particulate change for the precompression cylinder 520 may extend upwardly, above the precompression cylinder 520 as a result of the charging of the cylinder. Any excess particulate matter that extends above the cylinder 520 is then compacted slightly by the downward movement of the segment 526.

When the segment 526 is in place, the precompression cylinder 520 is completed, with the two bores 524 and 528 comprising a single precompression bore ready to receive the hydraulic piston 552. The inward or compressive movement of the piston 552 is then accomplished through its appropriate actuator, which may be similar to the actuators discussed above in conjunction with the apparatus of FIGS. 1–14.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Particulate compacting apparatus, in combination, comprising:

a base having a filling station, a compression station and a discharge station;

a frame having an axis of rotation and mounted rotatably on the base;

a plurality of compression chambers mounted on the frame;

a filling subassembly mounted at the filling station for successively filling the compression chambers with particulate material and for precompressing the particulate material;

a compression subassembly mounted at the compression station for further compressing the particulate material;

indexing drive means mounted on the base for advancing the frame stepwise to advance the compression chambers from station to station; and a discharge subassembly mounted at the discharge station cooperative with the compression chambers for successively discharging the logs therefrom.

2. The compacting apparatus of claim 1 wherein the frame is annular and the compression chambers are mounted on the frame in a circle.

3. The compacting apparatus of claim 1 wherein the compression chambers each include a bore having longitudinal axis and the chambers are mounted with their longitudinal axes parallel to the axis of rotation of the frame.

4. The compacting apparatus of claim 3 wherein the tube bores of the compression chambers are tapered along their longitudinal axes.

5. The compacting apparatus of claim 1 wherein the filling subassembly comprises a charging tube aligned with the compression chamber at the filling station, and a charging screw rotatably mounted in the charging tube.

6. The compacting apparatus of claim 5 wherein the charging screw is slidably mounted in the charging tube and is insertable into the compression chamber.

7. The compacting apparatus of claim 1 wherein:

the compression chambers have both ends thereof open; and the compacting apparatus further comprises a housing attached to the base, covering both ends of the compression chambers, and having holes therein to allow access to the compression chambers at the filling station, compression station and discharge station.

8. The compacting apparatus of claim 1 wherein the filling subassembly and the compression subassembly are coincidently aligned with the same compression chamber.

9. The compacting apparatus of claim 8 further comprising a gate valve operable to block the end of the compression chamber which is adjacent the filling subassembly.

10. The compacting apparatus of claim 8 further comprising a precompression chamber mounted at the compression station.

11. The compacting apparatus of claim 10 wherein the filling means is operable to deposit and precompress particulate material in the precompression and compression chambers.

12. The compacting apparatus of claim 1 wherein the indexing drive means comprises a ratchet mounted on the base and engageable with the frame; and a stop means operable to lock the frame at the completion of the indexing movement.

13. The compacting apparatus of claim 1 wherein the discharge subassembly comprises a discharge ram mounted on the base and operable to successively extend through each compression chamber.

14. The compacting apparatus of claim 1 further comprising temperature altering means adjacent to the exterior of each compression chamber.

15. Apparatus for compacting particulate material comprising:

a base;

an annular frame mounted rotatably on the base;

a plurality of compression chambers mounted in a circle on the frame, each compression chamber including a bore having a first open end and a second open end and a longitudinal axis between the first and second ends;

a housing attached to the base and covering the ends of the compression chambers;

a first opening in the housing dimensioned to sequentially communicate with the first end of each of the compression chambers as the frame is rotated;

a tube, having a cross section similar to the bores of the compression chambers, attached to the housing at the first opening along the longitudinal axis of the compression chamber forming a precompression chamber;

a compression ram slidably mounted in the precompression chamber;

a second opening in the housing opposite the first opening and communicating with the second ends of each of the compression chambers;

a gate valve operable to selectively close the second opening;

a feeding tube extending outwardly from the second opening along the axis of the compression chamber;

a feed screw in the feed tube operable to move longitudinally in the feed tube, compression chamber and precompression chamber;

feed means for supplying particulate material to the feed tube;

a third opening in the housing;

a discharge ram aligned with and operable to move through the third opening;

a fourth opening in the housing opposite the third opening dimensioned to allow discharge of the compacted particulate material formed in the compression chambers as the compression chambers are sequentially aligned therewith as the front rotates; and a means for indexing the frame to bring the compression chambers into successive alignment with the precompression chamber and charging tube and with the third and fourth openings and the discharge ram.

16. The compacting apparatus of claim 15 in which the bores of the compression chambers are tapered along the longitudinal axis between the first open ends and the second open ends.

17. The apparatus of claim 16 in which the length of the precompression cylinder is greater than the length of a compression chamber.

18. Apparatus for compressing particulate matter to form a solid element, comprising, in combination:

compression cylinder means in which particulate matter is compressed, including precompression cylinder means, compression die means aligned with and movable relative to the precompression cylinder means and having a first opening communicating with the precompression cylinder means and a second opening remote from the precompression cylinder means, cylinder head means closing the second opening of the compression die means while the particulate matter is being compressed, and means closing the first opening of the compression die means after the particulate matter is compressed;

loading means for loading particulate matter into the compression cylinder means; and compression means for compressing the particulate matter in the precompression cylinder means and in the compression die means.

19. The apparatus of claim 18 in which the compression die means includes a compression cylinder having a linearly tapered bore.

20. The apparatus of claim 19 in which the precompression cylinder means includes a precompression cylinder having a bore disposed adjacent to and aligned with the bore of the compression cylinder.

21. The apparatus of claim 20 in which the length of the bore of the precompression cylinder is substantially longer than the length of the bore of the compression cylinder.

22. The apparatus of claim 21 in which the particulate matter loaded into the precompression cylinder by the load means is compressed into the compression cylinder by the compression means.

23. The apparatus of claim 22 in which the load means includes an auger having an axis of rotation and is rotatable about its axis of rotation and movable longitudinally along its axis of rotation for conveying particulate matter to be compressed into the compression cylinder and into the precompression cylinder.

24. The apparatus of claim 23 in which the bore of the precompression cylinder has a first end and a second end, and the tapered bore of the compression cylinder has a first end and a second end, and the first end of the compression cylinder is disposed adjacent to the second end of the precompression cylinder.

25. The apparatus of claim 24 in which the diameter of the tapered bore of the second end of the compression cylinder is greater than the diameter of the first end of the compression cylinder.

26. The apparatus of claim 25 in which the compression means is disposed adjacent to the first end of the precompression cylinder.

27. The apparatus of claim 26 in which the load means is disposed adjacent to the second end of the compression cylinder and the auger moves longitudinally through the compression cylinder and into the precompression cylinder.

28. The apparatus of claim 22 in which the precompression cylinder means includes a cylinder segment movable upwardly and downwardly to allow particulate matter to be disposed directly into the precompression cylinder, and the feed means is disposed adjacent to the precompression cylinder.

29. The apparatus of claim 28 in which the cylinder segment of the precompression cylinder means further comprises means for precompressing the particulate matter in the precompression cylinder as it moves downwardly.

30. The apparatus of claim 29 in which the compression means includes a piston movable through the precompression cylinder for compressing the particulate matter into the compression die means after precompression by the cylinder segment.

31. The apparatus of claim 18 in which the loading means extends into the compression cylinder means to load particulate matter into the compression cylinder means.

32. The apparatus of claim 29 in which the loading means further comprises means for precompressing the particulate matter in the precompression cylinder means and in the compression die means.

33. The apparatus of claim 30 in which the loading means further comprises auger means for loading particulate matter into the compression cylinder means and movable into the compression cylinder means for loading and movable out of the compressing cylinder means upon reaching a predetermined back pressure of the particulate matter being loaded in the compression cylinder means.

34. The apparatus of claim 31 in which the compression means comprises piston means movable through the precompression cylinder for compressing the particulate matter from the precompression cylinder into the compression die means.

* * * * *